United States Patent
Ok et al.

(10) Patent No.: US 10,768,049 B2
(45) Date of Patent: Sep. 8, 2020

(54) HIGH-RESOLUTION TERAHERTZ WAVE CONCENTRATION MODULE, SCATTERED LIGHT DETECTION MODULE, AND HIGH-RESOLUTION INSPECTION APPARATUS USING TERAHERTZ BESSEL BEAM

(71) Applicant: KOREA FOOD RESEARCH INSTITUTE, Wanju-Gun, Jeollabuk-do (KR)

(72) Inventors: Gyeong-Sik Ok, Gyeonggi-do (KR); Sung-Wook Choi, Jeollabuk-do (KR); Hyun-Joo Chang, Seoul (KR)

(73) Assignee: KOREA RESEARCH INSTITUTE, Wanju-Gun, Jeollabuk (KR)

( * ) Notice: Subject to any disclaimer, the term of this patent is extended or adjusted under 35 U.S.C. 154(b) by 0 days.

(21) Appl. No.: 16/800,077

(22) Filed: Feb. 25, 2020

(65) Prior Publication Data

US 2020/0191656 A1 Jun. 18, 2020

Related U.S. Application Data

(62) Division of application No. 16/344,494, filed as application No. PCT/KR2016/013564 on Nov. 23, 2016, now Pat. No. 10,648,864.

(30) Foreign Application Priority Data

Nov. 1, 2016 (KR) .......................... 10-2016-0144573
Nov. 1, 2016 (KR) .......................... 10-2016-0144582
Nov. 23, 2016 (KR) .......................... 10-2016-0156244

(51) Int. Cl.
*G01J 3/42* (2006.01)
*G01V 8/10* (2006.01)
(Continued)

(52) U.S. Cl.
CPC ............ *G01J 3/42* (2013.01); *G01N 21/3581* (2013.01); *G01V 8/10* (2013.01); *G01V 8/14* (2013.01);
(Continued)

(58) Field of Classification Search
CPC ...... G01J 3/42; G01N 21/3581; G03H 1/2249
(Continued)

(56) References Cited

U.S. PATENT DOCUMENTS

2010/0302396 A1   12/2010   Golub et al.
2014/0270456 A1    9/2014   Khare et al.
(Continued)

FOREIGN PATENT DOCUMENTS

| JP | 4480146 B2 | 6/2010 |
|----|----|----|
| JP | 2015-141172 A | 8/2015 |
| KR | 2003-0029135 A | 4/2003 |
| KR | 10-0687900 B1 | 2/2007 |
| KR | 10-1392311 B1 | 5/2014 |
| KR | 10-2014-0130250 A | 11/2014 |

OTHER PUBLICATIONS

Busch et al., "Broadband "Focus-free" Terahertz Imaging Using Axicons", In: 2014 39th International Conference on Infrared, Millimeter, and Terahertz Waves (IRMMW-THz), IEEE, 2014 See International Search See Korean Actions.
(Continued)

*Primary Examiner* — Hung Nguyen
(74) *Attorney, Agent, or Firm* — Davis & Bujold PLLC; Michael J. Bujold

(57) ABSTRACT

A high resolution inspection apparatus using a terahertz Bessel beam. The high resolution inspection apparatus comprises a terahertz wave generating unit for generating a terahertz wave; a Bessel beam forming unit for forming a terahertz Bessel beam at an inspection target object using a terahertz wave incident from the terahertz wave generating unit; a first lens for changing an angle of the terahertz wave radiated, when the terahertz Bessel beam is transmitted
(Continued)

through the inspection target object, to be smaller; a second lens for concentrating the terahertz wave passing through the first lens and toward a detection unit; and a terahertz wave detection unit for detecting the terahertz wave concentrated by the second lens.

9 Claims, 12 Drawing Sheets

(51) Int. Cl.
    *G02B 5/00* (2006.01)
    *G01V 8/14* (2006.01)
    *G01N 21/3581* (2014.01)
    *G01V 8/18* (2006.01)

(52) U.S. Cl.
    CPC ............... *G01V 8/18* (2013.01); *G02B 5/00* (2013.01); *G02B 5/001* (2013.01); *G01J 2003/425* (2013.01)

(58) Field of Classification Search
    USPC ..................................................... 356/237.2
    See application file for complete search history.

(56) References Cited

U.S. PATENT DOCUMENTS

| | | |
|---|---|---|
| 2015/0212060 A1 | 7/2015 | Van Mechelen et al. |
| 2016/0084701 A1* | 3/2016 | Choi ............... G02B 5/001 250/393 |
| 2016/0271727 A1 | 9/2016 | Courvoisier et al. |

OTHER PUBLICATIONS

International Search Report Corresponding to PCT/KR2016/013564 dated Jul. 20, 2017.
Written Opinion Corresponding to PCT/KR2016/013564 dated Jul. 20, 2017.
Korean Office Action Corresponding to 10-2016-0144573 dated Dec. 16, 2016.
Korean Office Action Corresponding to 10-2016-0156244 dated Aug. 8, 2017.
Ok et al. "Foreign Object Detection by Sub-Terahertz Quasi-Bessel Beam Imaging", www.mdpi.com/journal/sensors, Sensors, 2013, 13, pp. 71-85, Dec. 20, 2012 See Korean Actions.

* cited by examiner

HIGH-RESOLUTION TERAHERTZ WAVE CONCENTRATION MODULE, SCATTERED LIGHT DETECTION MODULE, AND HIGH-RESOLUTION INSPECTION APPARATUS USING TERAHERTZ BESSEL BEAM This application is a divisional of U.S. application Ser. No. 16/344,494 filed Apr. 24, 2019, now U.S. Pat. No. 10,648,864, which application is a National Stage completion of PCT/KR2016/013564 filed Nov. 23, 2016 which application claims priority from South Korean Application No. 10-2016-0144573 filed Nov. 1, 2016, South Korean Application No. 10-2016-0144582 filed Nov. 1, 2016 and South Korean Application No. 10-2016-0156244 filed Nov. 23, 2016.

TECHNICAL FIELD

The present invention relates to a technique of inspecting a target object to be inspected (or an inspection target object) by a nondestructive method using a terahertz wave, and more particularly, to a high-resolution terahertz wave concentrating module having a high resolution below a wavelength beyond a diffraction limit.

Further, the present invention relates to a scattered light detection module which forms a ring beam using a Bessel beam and detects scattered light which is reflected from an inspection target object or transmitted through the inspection target object when the inspection target object is inspected using the formed ring beam, thus enhancing contrast.

In addition, the present invention relates to a high-resolution inspection apparatus using a terahertz Bessel beam, which recognizes a shape of an object using a scanner and synchronizes an optical head and a concentrating head according to the recognized shape of the object.

NATIONAL RESEARCH AND DEVELOPMENT PROJECT SUPPORTING PRESENT INVENTION

[Project No.] ER160200-01
[Ministry Name] Ministry of Science, ICT and Future Planning
[Research Management Specialist Agency] Korea Food Research Institute
[Research Title] Main Work of Korea Food Research Institute
[Research Project Title] Development of Terahertz High-Resolution Imaging Technique For Detecting Foreign Matter
[Contribution Rate] 1/1
[Managing Department] Korea Food Research Institute
[Research term] Apr. 1, 2016 to Dec. 31, 2017

BACKGROUND ART

An imaging method is generally used to inspect objects or substances in a non-destructive manner. Two methods, i.e., an image detection method using a continuous output light source and an image detection method using a spectroscopic method are mainstream imaging methods. These methods have advantages and disadvantages, but the image detection method using a continuous output light source is widely used in fields requiring relatively high power such as a transmission image.

A terahertz wave is widely used in the field of qualitatively checking for a hidden object or substance in a non-destructive manner due to various excellent properties such as transmissivity with respect to materials, possibility of qualitative checking, safety to a living body, and the like.

Accordingly, the terahertz wave has recently been utilized in various fields such as a search device in an airport or a security facility, a quality inspection device in a food or pharmaceutical company, a semiconductor inspection device, an engineering plastic inspection device, and the like.

The use of terahertz waves in production sites has increased, and much improvement has been made by continuous research in terms of major performance indices such as detection resolution, detection rate, detection area, and the like.

In the past, in order to obtain a terahertz wave transmission image, only one lens was used to concentrate a terahertz wave which is radiated after being transmitted through an object. In this case, if an apical angle of an axicon lens forming a Bessel beam is regulated to be small so as to make a beam size of the terahertz wave focused on an inspection target object be less than a wavelength, a terahertz Bessel beam passing through the inspection target object is radiated at a large angle and is not entirely concentrated to a detection unit. Thus, light concentration characteristics significantly deteriorates and a signal per noise ratio (SNR) of an inspection device is drastically degraded, and thus, a normal image cannot be obtained.

Further, it is difficult to obtain a clear image of a transparent inspection target object. Therefore, there is a need for research and development of a method for enhancing the contrast of a transparent inspection target object with little loss of a terahertz wave.

In addition, there is a problem in that a high resolution image cannot be obtained because a depth of focus of the Bessel beam does not reach an end portion of the inspection target object.

Further, if the inspection target object contains a large amount of water, a proportion of a terahertz wave transmitted through the inspection target object is drastically lowered due to the properties of terahertz waves being easily absorbed by moisture. As a result, the detecting unit cannot correctly inspect the inspection target object because a signal of the detected terahertz wave is weak.

The related art of the present invention is disclosed in Korean Patent Registration No. 10-1392311.

DISCLOSURE

Technical Problem

An aspect of the present invention provides a high-resolution terahertz wave concentrating module capable of increasing high resolution by increasing concentration efficiency of a terahertz Bessel beam transmitted through an inspection target object.

Another aspect of the present invention provides a scattered light detection module capable of increasing contrast for a transparent inspection target object by forming a ring beam without loss of a terahertz wave.

Another aspect of the present invention provides a high resolution inspection apparatus using a terahertz Bessel beam, in which an optical head moves along the contour of an inspection target object as much as possible according to a shape of the inspection target object so that a depth of focus of a Bessel beam may reach the end of the inspection target object.

Another aspect of the present invention provides a high-resolution inspection apparatus using a terahertz Bessel beam, which inspects an inspection target object containing moisture using a terahertz wave by rapidly cooling the inspection target object, so that the terahertz wave may easily be transmitted through the inspection target object.

Other objects and advantages of the present invention may be understood by the following descriptions and become apparent by the embodiments of the present invention. Also, it may be easily understood that the objects and advantages of the present invention are realized by means and combinations demonstrated in claims.

Technical Solution

According to an aspect of the present invention, there is provided a high resolution inspection apparatus using a Bessel beam, including: a scanner scanning a shape of an inspection target object; a terahertz wave optical head generating a terahertz wave and irradiating the inspection target object with the generated terahertz wave; a terahertz wave concentrating head detecting the terahertz wave transmitted through the inspection target object; a first transfer unit moving the terahertz wave optical head according to the scanned shape of the inspection target object; and a second transfer unit moving the terahertz wave concentrating head in the same manner as the optical head in synchronization with the first transfer unit.

The first transfer unit may move the terahertz wave optical head to maintain a predetermined distance from the inspection target object on the basis of a thickness of the scanned inspection target object so that the inspection target object is placed within a depth of focus of the generated terahertz wave.

The high resolution inspection apparatus may further include: a rapid cooling device maintaining the inspection target object in a low temperature state, wherein the terahertz wave optical head and the terahertz wave concentrating head may be disposed on opposing sides of the rapid cooling device so as to be spaced apart from each other.

The rapid cooling device may be configured as a housing including a window allowing the generated terahertz wave to be transmitted therethrough.

The high resolution inspection apparatus may further include: a defrosting device disposed in a rear stage of the rapid cooling device and defrosting the inspection target object.

According to another aspect of the present invention, there is provided a high resolution inspection apparatus using a Bessel beam, including: a terahertz wave generating unit generating a terahertz wave; a Bessel beam forming unit forming a terahertz Bessel beam at the inspection target object using the terahertz wave incident from the terahertz wave generating unit; a first lens changing an angle of the terahertz wave radiated when the terahertz Bessel beam is transmitted through the inspection target object, to be smaller; a second lens concentrating the terahertz wave passing through the first lens to a detection unit; and a terahertz wave detection unit detecting the terahertz wave concentrated by the second lens.

The Bessel beam forming unit may be a first axicon lens having an apical angle at which a diameter of the terahertz Bessel beam is smaller than a wavelength of the terahertz wave generated by the terahertz wave generating unit.

The first lens may be a second axicon lens arranged to be symmetrical to the first axicon lens with respect to the inspection target object.

The second axicon lens may have an apical angle having the same size as the first axicon lens.

The high resolution inspection apparatus may further include: an angle changing unit changing an angle of the terahertz wave incident from the terahertz wave generating unit to be smaller and to enter the Bessel beam forming unit.

The angle changing unit may be a first convex lens changing the angle of the terahertz wave incident from the terahertz wave generating unit to be smaller and the second lens may be a second convex lens arranged to be symmetrical to the first convex lens with respect to the inspection target object.

The second lens may be a third axicon lens having the same shape as the second axicon lens and arranged to be symmetrical to the second axicon lens with respect to an axis perpendicular to an optical axis.

The first lens may be a third convex lens changing an angle of the terahertz wave radiated when the terahertz Bessel beam is transmitted through the inspection target object.

The second lens may be a fourth convex lens arranged to be symmetrical to the third convex lens with respect to the axis perpendicular to the optical axis.

According to another aspect of the present invention, there is provided a high-resolution terahertz wave concentrating module, including: a first lens changing an angle of a terahertz wave radiated when a terahertz Bessel beam is transmitted through an inspection target object, to be smaller; and a second lens concentrating the terahertz wave passing through the first lens to a terahertz wave detector.

The first lens may be a second axicon lens forming the terahertz Bessel beam and arranged to be symmetrical to a first axicon lens having an apical angle at which a diameter of the terahertz Bessel beam is smaller than a wavelength of the terahertz wave generated by the terahertz wave generating unit with respect to the inspection target object.

The second axicon lens may have an apical angle having the same size as the first axicon lens.

The second lens may be a second convex lens arranged to be symmetrical to a first convex lens changing an angle of the terahertz wave incident from the terahertz wave generating unit, to be smaller with respect to the inspection target object.

The second lens may have the same shape as the second axicon lens and may be arranged to be symmetrical to the second axicon lens with respect to an axis perpendicular to an optical axis.

The first lens may be a third convex lens changing an angle of the terahertz wave radiated when the terahertz Bessel beam is transmitted through the inspection target object.

The second lens may be a fourth convex lens arranged to be symmetrical to the third convex lens with respect to the axis perpendicular to the optical axis.

According to another aspect of the present invention, there is provided a high resolution inspection apparatus using a terahertz Bessel beam, including: a terahertz wave generating unit generating a terahertz wave; a Bessel beam forming unit generating a terahertz Bessel beam using the terahertz wave incident from the terahertz wave generating unit; a ring beam forming unit forming a ring beam using the terahertz Bessel beam and concentrating the formed ring beam to an inspection target object; a scattered light detecting unit detecting scattered light generated from the inspection target object; and a ring beam detecting unit detecting a ring beam transmitted through the inspection target object.

The ring beam forming unit may include a third lens forming a ring beam and concentrating the formed ring beam to the inspection target object.

The scattered light detecting unit may include a reflected scattered light detecting unit provided inside the third lens and detecting scattered light reflected from the inspection target object.

The reflected scattered light detecting unit may be provided inside a ring beam exiting from the third lens.

The scattered light detecting unit may include a transmitted scattered light detecting unit detecting scattered light transmitted from the inspection target object.

The transmitted scattered light detecting may be arranged inside a ring beam incident from the third lens.

The third lens may include a path changing unit changing a path of the scattered light reflected from the inspection target object, and the reflected scattered light detecting unit may detect scattered light incident from the path changing unit.

The ring beam forming unit may include a fourth lens changing an angle of the terahertz Bessel beam incident from the Bessel beam forming unit to be smaller and to enter the third lens.

The Bessel beam forming unit may be a fourth axicon lens having an apical angle at which a diameter of the terahertz Bessel beam is smaller than a wavelength of the terahertz wave generated by the terahertz wave generating unit.

The fourth lens may be a fifth axicon lens arranged to be symmetrical to the fourth axicon lens with respect to the inspection target object.

The fifth axicon lens may have an apical angle having the same size as the fourth axicon lens.

The high resolution inspection apparatus may further include: an angle changing unit changing an angle of the terahertz wave incident from the terahertz wave generating unit to be smaller and incident on the Bessel beam forming unit.

The angle changing unit may be a fifth convex lens changing the angle of the terahertz wave incident from the terahertz wave generating unit, to be smaller, and the third lens may be a sixth convex lens arranged to be symmetrical to the fifth convex lens with respect to the inspection target object.

The third lens may be a sixth axicon lens having the same shape as the fifth axicon lens and arranged to be symmetrical to the fifth axicon lens with respect to an axis perpendicular to an optical axis.

The fourth lens may be a seventh convex lens changing an angle of the terahertz wave radiated when the terahertz Bessel beam is transmitted through the inspection target object.

The fourth lens may be an eighth convex lens arranged to be symmetrical to the seventh convex lens with respect to the axis perpendicular to the optical axis.

According to another aspect of the present invention, there is provided a scattered light detection module, including: a ring beam forming unit forming a ring beam using the terahertz Bessel beam and concentrating the formed ring beam to an inspection target object; and a scattered light detecting unit detecting scattered light generated from the inspection target object.

The ring beam forming unit may include a third lens forming a ring beam and concentrating the formed ring beam to the inspection target object.

The scattered light detecting unit may include a reflected scattered light detecting unit provided inside the ring beam exiting from the third lens and detecting scattered light reflected from the inspection target object.

The scattered light detecting unit may include a transmitted scattered light detecting unit arranged inside a ring beam incident from the third lens and detecting scattered light transmitted from the inspection target object.

The third lens may include a path changing unit changing a path of the scattered light reflected from the inspection target object, and the reflected scattered light detecting unit may detect scattered light incident from the path changing unit.

Advantageous Effects

According to the disclosure, since the terahertz wave penetrating an inspection target object is concentrated substantially without loss, concentration efficiency may be increased.

Further, a clear image may be obtained by increasing resolution by regulating a diameter of the terahertz wave beam focused on an inspection target object to be equal to or less than a wavelength of the terahertz wave.

Further, a ring beam may be formed without loss of the terahertz wave, so that the contrast of a transparent inspection target object may be increased.

Further, the contrast of a transparent inspection target object may be increased by detecting scattered light generated from the inspection target object.

Further, since the scattered light detecting unit is disposed inside the generated ring beam, a separate space due to an addition of the scattered light detecting unit is not required, thereby achieving miniaturization.

Also, although the apical angle of the axicon of the Bessel beam forming unit is reduced to realize high resolution, a high resolution image may be obtained by reducing the diameter of the ring beam generated using two lenses of the ring beam forming unit.

Further, since the optical head moves along the contour of an inspection target object as much as possible according to the shape of the inspection target object, the inspection target object may be positioned within the depth of focus of the Bessel beam, whereby a clear transparent image may be obtained.

Further, since an inspection target object containing moisture is rapidly cooled and inspected using a terahertz wave, the terahertz wave may easily penetrate the inspection target object.

BEST MODES

Hereinafter, the present invention will be described in detail with reference to the accompanying drawings.

Figure 1:
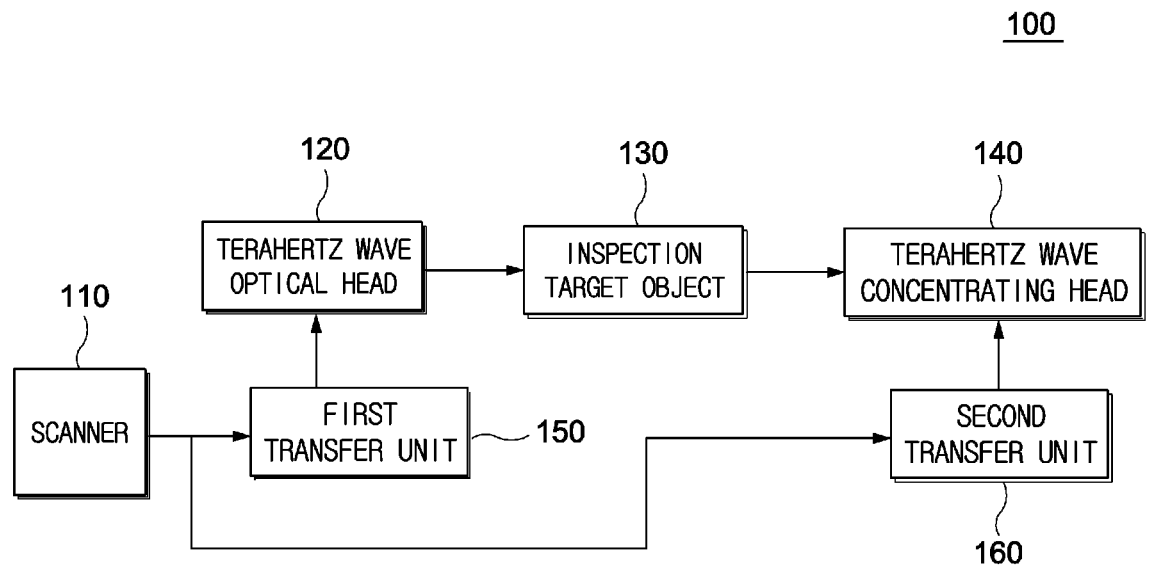
FIG. 1 is a block view of a high resolution inspection apparatus using a terahertz Bessel beam according to an embodiment of the present invention.

FIG. 1 is a view illustrating a high resolution inspection apparatus using a terahertz Bessel beam according to an embodiment of the present invention.

Referring to FIG. 1, a high resolution inspection apparatus 100 using a Bessel beam includes a scanner 110, a terahertz wave optical head 120, an inspection target object 130, a terahertz wave concentrating head 140, a first transfer unit 150, and a second transfer unit 160.

The scanner 110 may scan a shape of an inspection target object.

The terahertz wave optical head 120 may generate a terahertz wave and irradiate the generated terahertz wave to the inspection target object 130.

The terahertz wave concentrating head 140 may detect a terahertz wave transmitted through the inspection target object 130.

The first transfer unit 150 may move the terahertz wave optical head 120 according to the shape of the inspection target object scanned by the scanner 110. The first transfer unit 150 may move the terahertz wave optical head 120 in a direction to a two-dimensional plane and in a direction perpendicular to the two-dimensional plane.

For example, in order to place the inspection target object 130 within a depth of focus of the terahertz wave generated by the terahertz wave optical head 120, the first transfer unit 150 may move the terahertz wave optical head 120 such that the terahertz wave optical head 120 and the inspection target object 130 are maintained at a predetermined distance on the basis of a thickness of the scanned inspection target object 130.

Specifically, assuming that the inspection target object has a portion having a thickness A and a portion having a thickness B, the first transfer unit 150 may move the optical head 120 by X in a vertical direction when the portion having the thickness A is scanned. Also, when the portion having the thickness B is scanned, the first transfer unit 150 may move the optical head 120 by Y in the vertical direction.

Accordingly, the first transfer unit 150 may move the optical head 120 along the contour of the inspection target object 130 as much as possible so that the inspection target object is positioned within the depth of focus of the Bessel beam to obtain a clear transmission image.

The second transfer unit 160 may be synchronized with the first transfer unit 150 to move the terahertz wave concentrating head 140 in the same manner as the terahertz wave optical head 120. Thus, the first transfer unit 150 and the second transfer unit 160 may cause the terahertz wave optical head 120 and the terahertz wave concentrating head 140 to be aligned.

Figure 2:
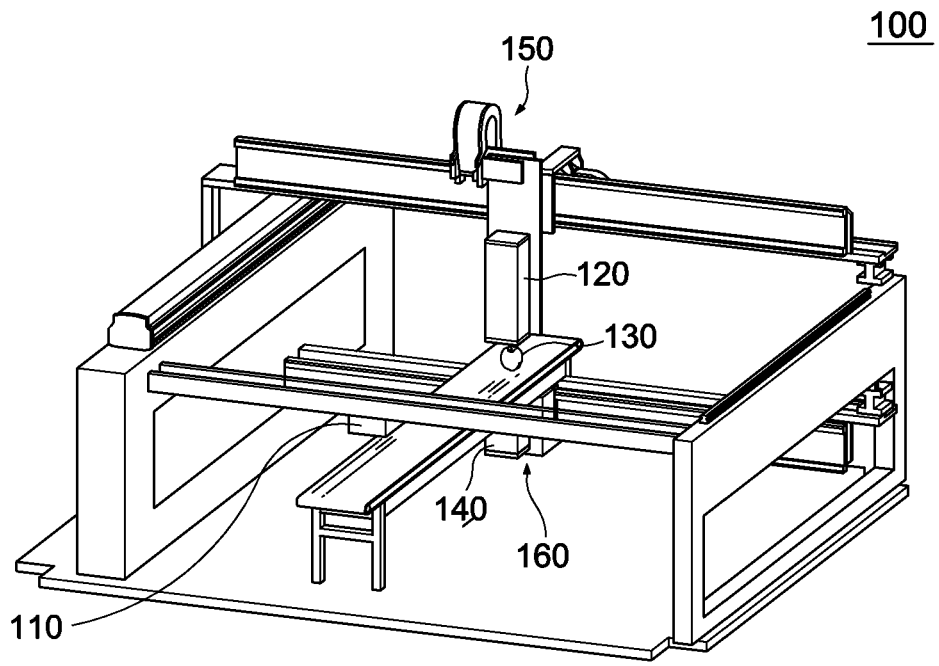
FIG. 2 is a view specifically illustrating a high resolution inspection apparatus using the terahertz Bessel beam of FIG. 1.

FIG. 2 is a view specifically illustrating the high resolution inspection apparatus using a terahertz Bessel beam of FIG. 1.

Referring to FIG. 2, the high resolution inspection apparatus 100 using a Bessel beam includes the scanner 110, the terahertz wave optical head 120, the inspection target object 130, the terahertz wave concentrating head 140, the first transfer unit 150, and the second transfer unit 160.

The scanner 110 may scan the shape of the inspection target object. The scanner 110 may be disposed in a separate frame or may be disposed integrally in front of the terahertz wave optical head 120.

The terahertz wave optical head 120 generates a terahertz wave and irradiates the generated terahertz wave to the inspection target object 130.

The first transfer unit 150 may be mechanically coupled to the terahertz wave optical head 120. The first transfer unit 150 may move the terahertz wave optical head 120 according to the shape of the inspection target object scanned by the scanner 110. The first transfer unit 150 may move the terahertz wave optical head 120 in the direction to the two-dimensional plane and in the direction perpendicular to the two-dimensional plane.

The inspection target object 130 may be placed on a conveyor belt and may be moved from the scanner 110 toward the terahertz wave optical head 120. The inspection target object 130 may be moved by the conveyor belt or the like, as in the present embodiment, or may be fixed to be disposed at a specific position.

The terahertz wave concentrating head 140 may detect a terahertz wave transmitted through the inspection target object 130.

The second transfer unit 160 may be synchronized with the first transfer unit 150 to move the terahertz wave concentrating head 140 in the same manner as the terahertz wave optical head 120.

The first transfer unit 150 and the second transfer unit 160 may cause the terahertz wave optical head 120 and the terahertz wave concentrating head 140 to be aligned.

The present embodiment merely provides the structure for helping understand the shape of the high resolution inspection apparatus using a terahertz Bessel beam, and the high resolution inspection apparatus using a terahertz Bessel beam may be realized as various types of structures.

Figure 3:
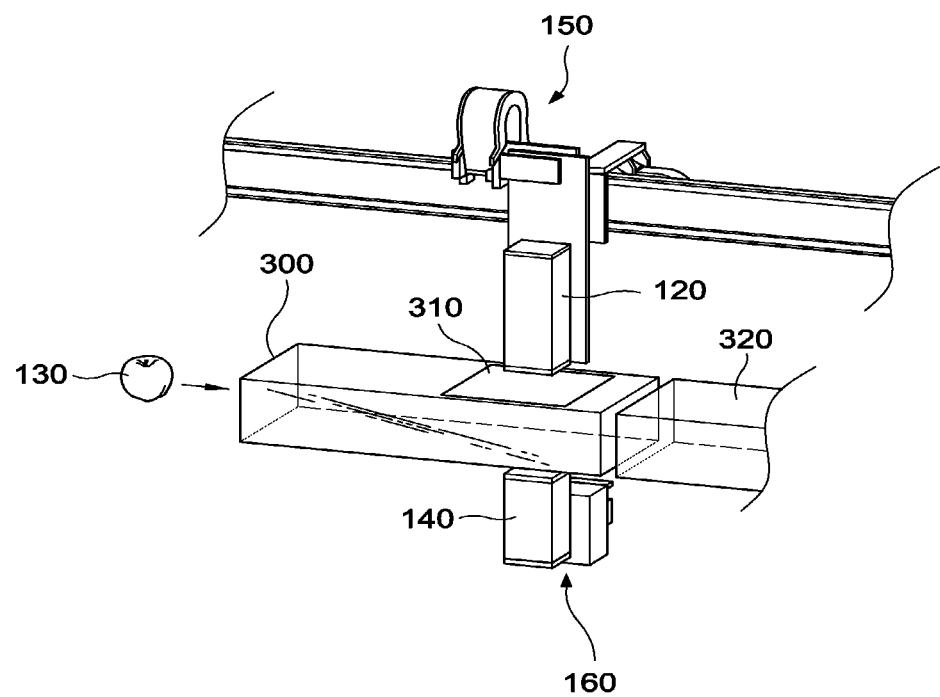
FIG. 3 is a view illustrating a high resolution inspection apparatus using a terahertz Bessel beam according to another embodiment of the present invention.

FIG. 3 is a view illustrating a high resolution inspection apparatus using a terahertz Bessel beam according to another embodiment of the present invention.

Referring to FIG. 3, the high resolution inspection apparatus using a Bessel beam includes the terahertz wave optical head 120, the inspection target object 130, the terahertz wave concentrating head 140, the first transfer unit 150, the second transfer unit 160, a rapid cooling device 300, and a defrosting device 320.

The terahertz wave optical head 120, the inspection target object 130, the terahertz wave concentrating head 140, the first transfer unit 150, and the second transfer unit 160 are the same as those of FIG. 1, and thus, a redundant description thereof will be omitted.

The terahertz wave optical head 120 and the terahertz wave concentrating head 140 may be disposed on opposing sides of the rapid cooling device 300 so as to be spaced apart from each other.

The rapid cooling device 300 may maintain the inspection target object 130 at a low temperature. For example, the rapid cooling device 300 may cool the inspection target object 130 to a solid state. Since the inspection target object 130 is maintained at a low temperature or maintained in a solid state, a rate of absorption of the terahertz wave into the inspection target object 130 may be reduced.

The rapid cooling device 300 may be configured as a housing including a window 310 through which the generated terahertz wave may be transmitted. The inspection target object 130 may pass through the inside of the housing of the rapid cooling device 300. For example, the window 310 may be formed of a heat insulating foam which has a high insulation effect and allows a terahertz wave to easily pass therethrough.

The defrosting device 320 may be disposed at a rear end of the rapid cooling device 300 and defrost the rapidly cooled inspection target object 130.

The structure of the rapid cooling device 300 in this embodiment is merely an embodiment shown for the purpose of explanation, and the rapid cooling device 300 may be realized by various types of structures.

Since the inspection target object 130 is rapidly cooled for the terahertz wave to be easily transmitted therethrough, the high resolution inspection apparatus using a terahertz Bessel beam may also inspect the inspection target object containing moisture with high resolution.

Figure 4:
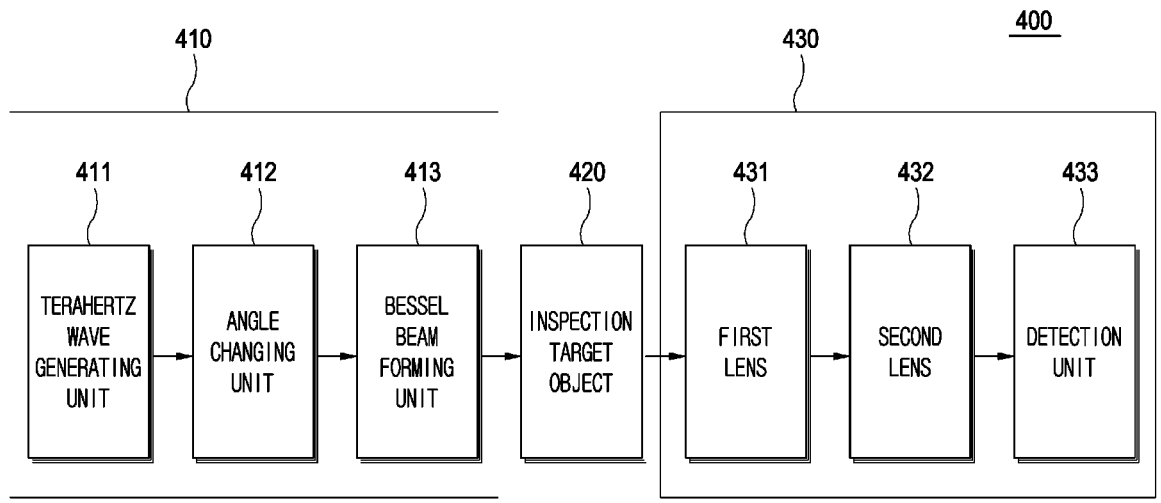
FIG. 4 is a view illustrating a high resolution inspection apparatus using a Bessel beam according to another embodiment of the present invention.

FIG. 4 is a view illustrating a high resolution inspection apparatus using a Bessel beam according to another embodiment of the present invention.

Referring to FIG. 4, a high resolution inspection apparatus 400 using a Bessel beam may include a terahertz wave optical head 410, an inspection target object 420, and a terahertz wave concentrating head 430. Although not illustrated in FIG. 4, the scanner 110, the first transfer unit 150, and the second transfer unit 160 illustrated in FIG. 1 may further be included in this embodiment.

The terahertz wave optical head 410 may include a terahertz wave generating unit 411, an angle changing unit 412, and a Bessel beam forming unit 413. In the present embodiment, a case where the terahertz wave generating unit 411, the angle changing unit 412, and the Bessel beam forming unit 413 are all included in the terahertz wave optical head 410 will be described as a reference, but the terahertz wave optical head 410 may be realized by including only some of the terahertz wave generating unit 411, the angle changing unit 412, and the Bessel beam forming unit 413.

A Bessel beam is an electromagnetic wave given as a zero-th-order Bessel function of the first kind in a solution set of Maxwell's equations about a free space and has been known as a non-diffractive beam. The Bessel beam was first introduced by Durnin in 1987 and has axial asymmetry, in which energy is concentrated as much as a predetermined length about an axis in the shape of a needle. Since it is implemented by an optical system having not an infinite aperture, but a limited aperture, there is no Bessel beam that travels infinitely, so it is also usually called a quasi-Bessel-beam (QBB). The QBB is made by a hologram, a combination of a lens and a circular mask composed of a plurality of rings or limited apertures, or a conical lens known as an axicon.

The terahertz wave generating unit 110 may generate a terahertz wave. The terahertz wave refers to an electromagnetic wave in a terahertz region and preferably has a frequency of 0.1 THz to 10 THz. However, although a terahertz wave is slightly outside the range, if the range is easily conceivable by a person skilled in the art to which the present invention pertains, the terahertz wave may be regarded as the terahertz wave of the present invention.

The angle changing unit 120 may change an angle of the terahertz wave incident from the terahertz wave generating unit 411, to be smaller and to enter the Bessel beam forming unit 413. For example, the angle changing unit 412 may change the incident terahertz wave to a predetermined angle or smaller or parallel with respect to the optical axis. The angle changing unit 412 may be a convex lens for refracting the incident terahertz wave in parallel or a parabolic reflector reflecting the incident terahertz wave in parallel.

The Bessel beam forming unit 413 may form a terahertz Bessel beam on at least a portion of the inspection target object using the terahertz wave incident from the angle changing unit 412.

When the angle changing unit 412 is not provided, the Bessel beam forming unit 413 may form the terahertz Bessel beam on at least a portion of the inspection target object using the terahertz wave incident from the terahertz wave generating unit 411.

Since it is difficult for the Bessel beam forming unit 413 to form an ideal Bessel beam in reality, the Bessel beam formed by the Bessel beam forming unit 413 may be called a quasi-Bessel beam (QBB). A configuration of forming the Bessel beam by the Bessel beam forming unit 413 will be described in more detail with reference to FIG. 2.

The Bessel beam forming unit 413 may be disposed such that a terahertz wave whose angle is changed by the angle changing unit 412 is incident on be perpendicular with respect to a light incident surface of the Bessel beam forming unit 413.

The Bessel beam forming unit 413 may be configured as various types. That is, the Bessel beam forming unit 413 may include a diffractive optical element including a plurality of circular recesses or circular holes and a lens having a positive refractive index, or may be configured as an axicon lens or a hologram optical element.

The Bessel beam forming unit 413 may be a first axicon lens at which a diameter of a terahertz Bessel beam focused on the inspection target object is smaller than a wavelength of the terahertz wave generated by the terahertz wave generating unit. In this embodiment, the apical angle that forms the diameter of the terahertz Bessel beam which is equal to or smaller than the wavelength is defined as a maximum apical angle.

In this case, a maximum value of the apical angle τ of the first axicon lens may be calculated through equations below using a diameter ($\rho_{FWHM}$) of a full width at half maximum, a wavelength (Δ), and a refractive index (n, $n_0$).

$$J_0(k\rho \sin \alpha_0)^2 = J_0(1.1264)^2 = 0.5 \quad \text{[Equation 1]}$$

$$\rho_{FWHM} = \frac{1.1264}{k \sin \alpha_0}$$

Here, J0(z) is a zero-th-order Bessel function, and in order to satisfy $J_0^2(z)=0.5$, $J_0(z)$ must be √2 ($J_0(z)=1/\sqrt{2}$). Here, z satisfying this value is 1.1264 (z=1.1264). Thus, Equation 1 may be derived from equation 1.1264=k*$\rho_{FWHM}$*sin $\alpha_0$. In $J_0^2(z)=0.5$, the value 0.5 may be changed.

$$\alpha_0 = \arcsin\left(\frac{n}{n_0}\cos\left(\frac{\tau}{2}\right)\right) + \frac{\tau - \pi}{2}, \left(0 < \alpha_0 < \frac{\tau}{2}\right) \quad \text{[Equation 2]}$$

$$k = \frac{2\pi}{\lambda} \quad \text{[Equation 3]}$$

$$\rho_{FWHM} = \frac{1.1264}{\frac{2\pi}{\lambda}\sin\left[\arcsin\left(\frac{n}{n_0}\cos\left(\frac{\tau}{2}\right)\right) + \frac{\tau - \pi}{2}\right]} \quad \text{[Equation 4]}$$

Here, $J_0$: zero-th-order Bessel function
$\rho_{FWHM}$: full width at half maximum of focused terahertz Bessel beam
λ: wavelength of terahertz wave
$\alpha_0$: half value of crossing angle of terahertz wave crossing after passing through axicon lens
n: refractive index of first axicon lens
$n_0$: average refractive index of surrounding environment
τ: apical angle of first axicon lens

[Equation 4] is an equation derived using [Equation 1], [Equation 2], and [Equation 3].

Meanwhile, a minimum value of the apical angle of the first axicon lens may be an apical angle of the first axicon lens where total internal reflection according to the refractive index of the first axicon does not occur.

Thus, the apical angle of the first axicon lens at which the diameter of the terahertz Bessel beam is formed to be smaller than the wavelength of the terahertz wave generated by the terahertz wave generating unit may be formed between the maximum value and the minimum value recognized as described above.

The inspection target object 420 is a target object to be inspected and may be disposed between the terahertz wave optical head 410 and the terahertz wave concentrating head 430.

The terahertz wave concentrating head 430 includes a first lens 431, a second lens 432, and a detection unit 433. In this embodiment, the case where the first lens 431, the second lens 432, and the detection unit 433 are included in the terahertz wave concentrating head 430 is described as a reference, but the terahertz wave concentrating head 430 may include only some of the first lens 431, the second lens 432, and the detection unit 433.

The first lens 431 may change the angle of the terahertz wave radiated when the terahertz Bessel beam generated by the Bessel beam forming unit 413 is transmitted through the inspection target object 420. For example, the first lens 431 may change the angle of the terahertz wave, to be smaller than or equal to a predetermined angle with respect to the optical axis.

The second lens 432 may concentrate the terahertz wave passing through the first lens 431 to the detection unit 433.

In the present invention, the high-resolution terahertz wave concentrating module refers to a device including the first lens 431 and the second lens 432. For example, the high-resolution terahertz wave is spread in the form of a ring-shaped circular beam away from the Bessel beam forming unit 413, and here, the high-resolution terahertz wave concentrating module (first lens and second lens) concentrates the circularly spreading terahertz wave so that concentrated terahertz wave may travel toward the detection unit 433.

For example, the high-resolution terahertz wave concentrating module may be realized in various types of components such as a convex lens, a concave mirror, a parabolic reflector, an ellipsoidal mirror, and the like.

The detection unit 433 may detect the terahertz wave concentrated by the second lens. For example, the detection unit 433 may detect an intensity of the terahertz wave. For example, the detection unit 433 may be realized to include a Schottky diode.

An image generating unit (not shown) may generate an image using the Bessel beam detected through the detection unit 433. The generated image may be displayed on a display unit (not shown).

The high-resolution inspection apparatus using a Bessel beam may concentrate the terahertz wave transmitted through the inspection target object with little loss, thereby increasing concentration efficiency.

Further, in the high resolution inspection apparatus using the Bessel beam, the diameter of the terahertz wave reaching the detection unit is regulated to be equal to or less than the wavelength of the terahertz wave, whereby a clear image may be obtained by increasing resolution.

Figure 5:
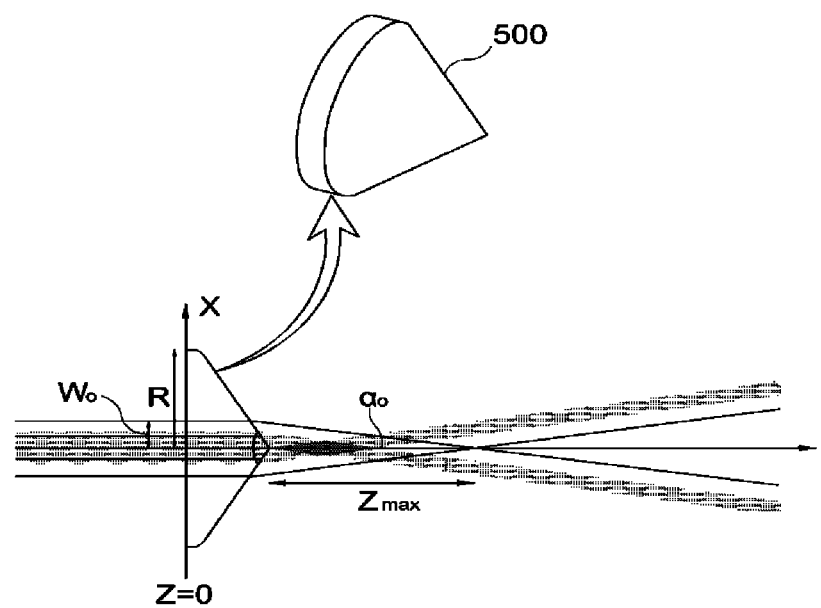
FIG. 5 is a view illustrating a Bessel beam forming unit according to an embodiment of the present invention.

FIG. 5 is a view illustrating a Bessel beam forming unit according to an embodiment of the present invention.

Referring to FIG. 5, the Bessel beam forming unit may include an axicon 500. R is a radius of the axicon lens, τ is an apical angle of the axicon lens, α0 is half of a crossing angle of a beam crossing after passing through the axicon lens, and $\omega_0$ is a radius of parallel light incident on the axicon lens. In addition, a section in which the Bessel beam is formed is denoted by $Z_{max}$ in FIG. 5, and the terahertz wave incident on the axicon lens is subjected to constructive interference in this section and energy gathers toward the center along the z axis.

Here, a Gaussian beam incident on the axicon lens and the Bessel beam formed by the axicon lens are distributed to have axial symmetry, and a field is distributed in a circular shape along the z axis. That is, when viewed in a direction from the left to the right in FIG. 5, both the Gaussian beam in front of the axicon lens and the Bessel beam in the rear of the axicon lens are formed to have a circular shape. In particular, the Bessel beam formed by the axicon lens spreads as a ring-shaped circular beam away from the axicon lens.

Meanwhile, in a transmission image obtained from each point being drawn at a time as with raster scanning, the most important factor determining resolution of the image is a diameter of a beam incident on an inspection target object 1.

In particular, in the case of the Bessel beam formed by an axicon lens, a diameter thereof is determined by the wavelength of terahertz wave and $\alpha_0$, and here, $\alpha_0$ may be obtained using Equation 1 according to the Snell's law.

$$\alpha_0 = \arcsin\left(\frac{n}{n_0}\cos\left(\frac{\tau}{2}\right)\right) + \frac{\tau - \pi}{2}, \left(0 < \alpha_0 < \frac{\tau}{2}\right) \quad \text{[Equation 5]}$$

Here, $n_0$ denotes a refractive index in the air, n denotes a refractive index of the axicon lens, and $\tau$ denotes an apical angle of the axicon lens.

Meanwhile, $Z_{max}$ corresponds to a depth of focus, and the depth of focus may be expressed by Equation 6 below.

$$Z_{max} = w_0/\tan\alpha_0 \quad \text{[Equation 6]}$$

Here, $w_0$ denotes a radius of the beam incident on the axicon lens as illustrated in FIG. 5. Referring to this equation, it can be seen that the depth of focus also relies on $\alpha_0$.

Accordingly, from these viewpoints, it can be seen that the resolution and the depth of focus of the image are significantly changed mainly by the value $\alpha_0$.

Based on this, $\alpha_0$ and the depth of focus may be calculated on the assumption that $n_0$ is 1.0, n is 1.54 (high density polyethylene), $\tau$ is 150°, and R is 25 mm regarding the axicon lens illustrated in FIG. 5.

First, when $\alpha_0$ is calculated using Equation 5, $\alpha_0$ may be calculated to 8.5°. Further, when the depth of focus ($Z_{max}$) is calculated using Equation 6, $Z_{max}$ may be calculated to 40.2 mm.

The Bessel beam forming unit may include a diffractive optical element in which a plurality of circular recesses or circular holes are arranged concentrically and a lens having a positive refractive index. Here, the circular recesses or holes formed in the diffractive optical element may be formed to be concavely recessed or penetrating through the diffractive optical element. The lens having such a positive refractive index is disposed on the opposite side of a direction in which parallel light is incident with respect to the diffractive optical element.

In addition to the present embodiment, the Bessel beam forming unit may be configured in various forms such as a hologram structure, or the like.

Figure 6:
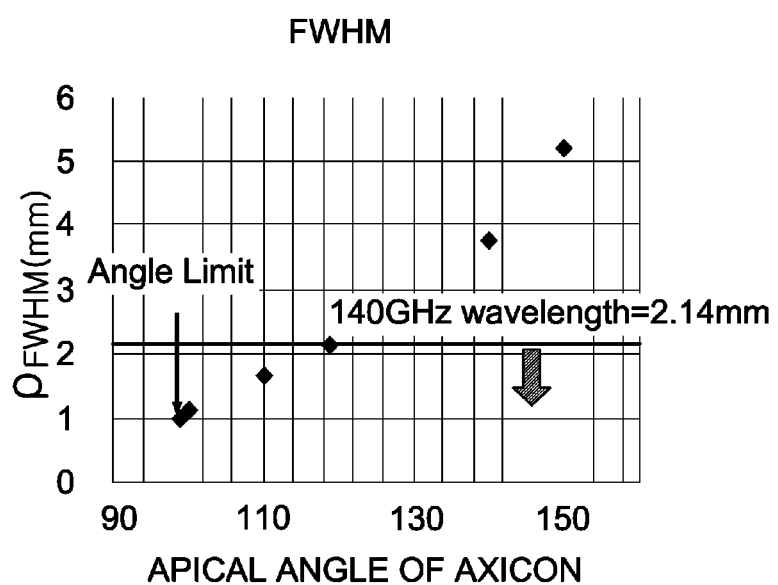
FIG. 6 is a view illustrating a calculation of a diameter of a terahertz wave beam focused on different apical angles using Equation 4.

FIG. 6 is a view illustrating calculation of a diameter of a terahertz wave beam focused on different apical angles using Equation 4.

Referring to FIG. 6, it can be seen that, when the wavelength $\lambda$ of the terahertz wave is 2.14 mm, the refractive index n of the first axicon lens is 1.54, and the average refractive index $n_0$ of the surrounding environment is 1, a maximum value of the apical angle $\tau$ of the first axicon lens is about 119 and a minimum value of the apical angle $\tau$ of the first axicon lens is about 99.

Figure 7:
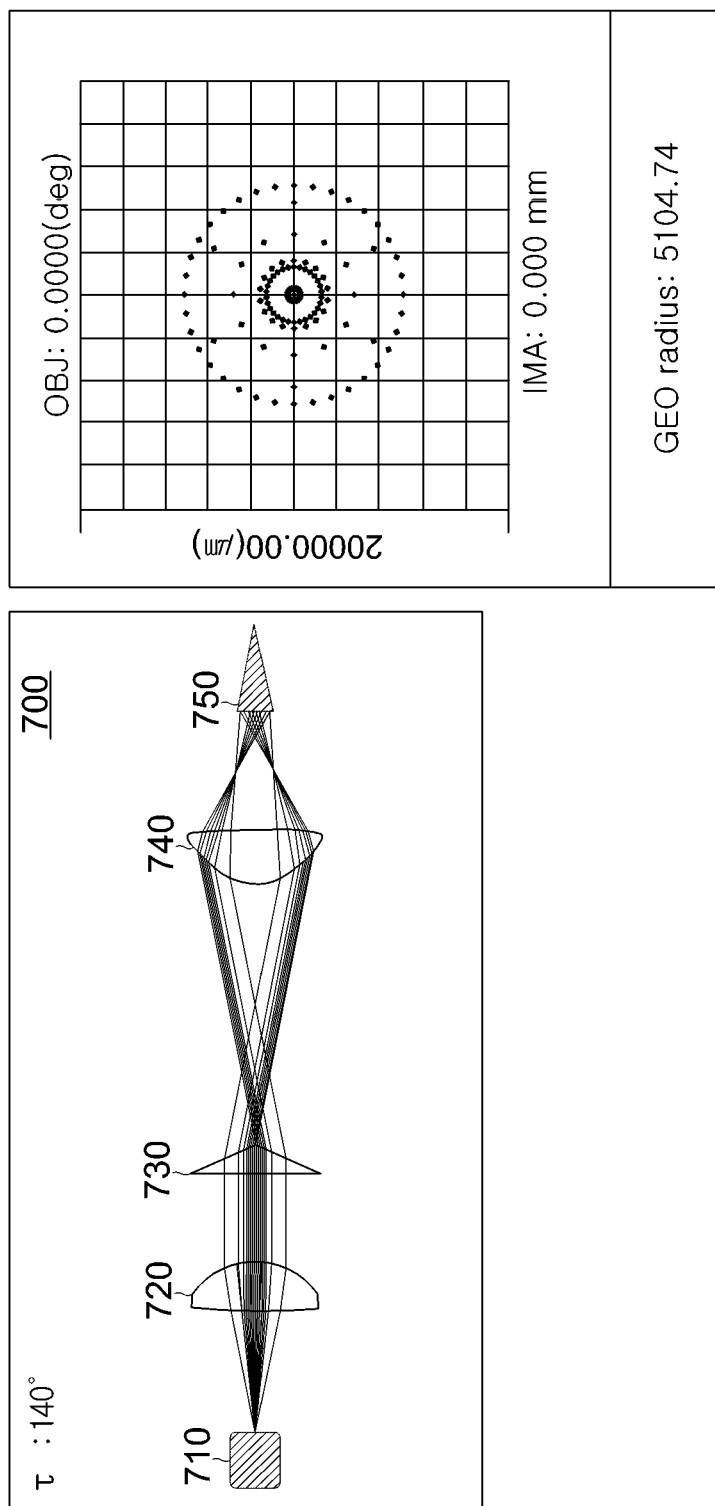
FIGS. 7 and 8 are views illustrating an inspection apparatus for concentrating light using a single lens.
Figure 8:
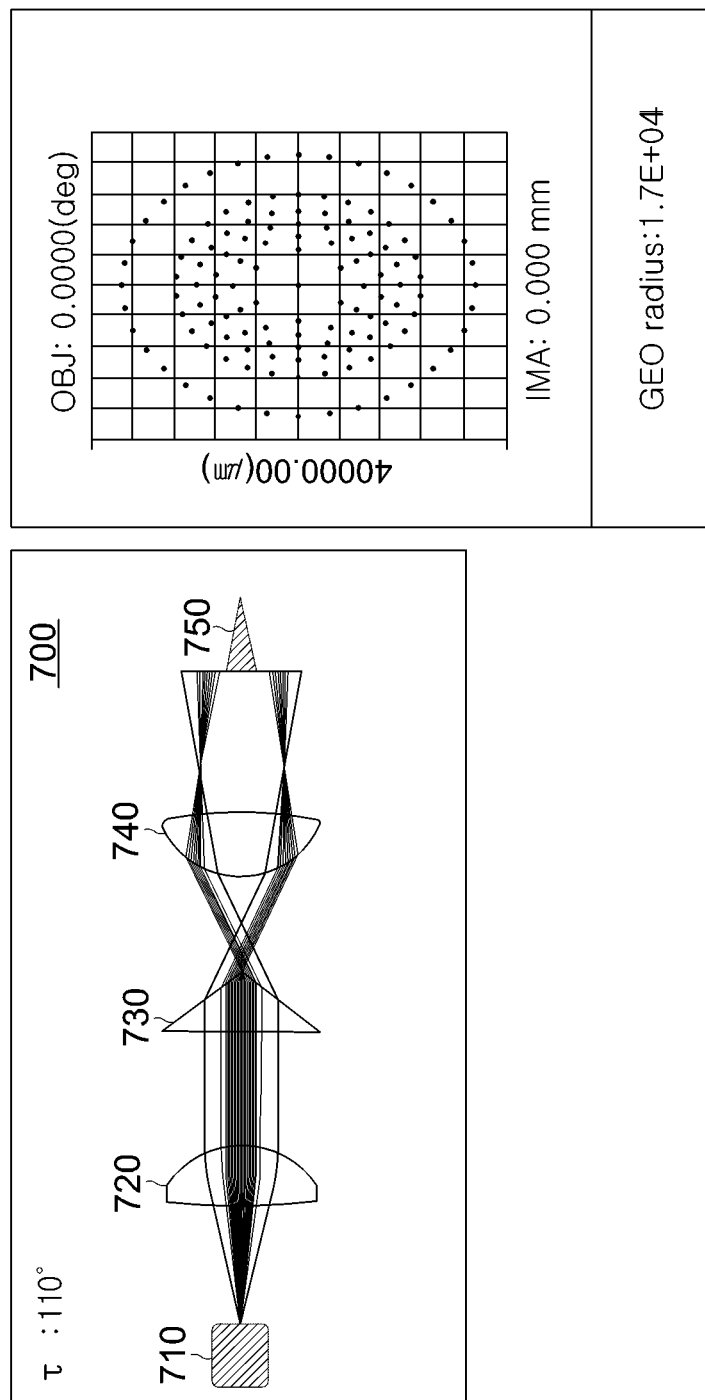

FIGS. 7 and 8 are views illustrating an inspection apparatus for concentrating light using a single lens.

Referring to FIGS. 7 and 8, an inspection apparatus 700 includes a terahertz wave generating unit 710, an angle changing unit 720, a Bessel beam forming unit 730, a light concentrating unit 740, and a detection unit 750.

The terahertz wave generating unit 710 may generate a terahertz wave.

The angle changing unit 720 may change the angle of the terahertz wave incident from the terahertz wave generating unit 710, to be smaller and to enter the Bessel beam forming unit 730.

The Bessel beam forming unit 730 may form a terahertz Bessel beam on at least a portion of the inspection target object using the terahertz wave incident from the angle changing unit 720. For example, the Bessel beam forming unit may be an axicon. The inspection target object may be formed between the Bessel beam forming unit 730 and the light concentrating unit 740.

The light concentrating unit 740 may be implemented as a single lens.

The detection unit 750 may detect the terahertz wave concentrated by the light concentrating unit 740.

Referring to FIG. 7, when the apical angle of the axicon, which is the Bessel beam forming unit 730, is 140°, a radius of the terahertz wave transmitted through the inspection target object and incident on the detection unit 750 is about 5.1 mm, and thus, a diameter of the terahertz wave at the detection unit 750 is about 10.2 mm.

In this case, most of the terahertz waves incident from the light concentrating unit 740 using a single lens have a diameter of about 9 mm and may be concentrated on the detection unit 750 having a horn.

Referring to FIG. 8, in order to form the diameter of the terahertz Bessel beam focused on the inspection target object, to be equal to or smaller than the wavelength of the terahertz wave, the apical angle of the axicon must be small. In other words, the apical angle of the axicon must be small to realize high resolution. Thus, the angle was formed to be 110° smaller than the apical angle of the axicon in FIG. 7.

When the apical angle of the axicon, which is the Bessel beam forming unit 730, is 110°, the radius of the terahertz wave incident on the detection unit 750 after being transmitted through the inspection target object is about 17 mm, and thus, the diameter of the terahertz wave at the inspection unit 750 is about 34 mm.

As the diameter of the terahertz wave incident on the detector 750 increases, only a portion of the terahertz waves incident from the light concentrating unit 740 using a single lens is concentrated on the detection unit 750. In other words, a large amount of the terahertz waves incident from the light concentrating unit 740 is not incident on the detection unit 750, significantly degrading detection performance of the detection unit 750 is remarkably deteriorated.

Figure 9:
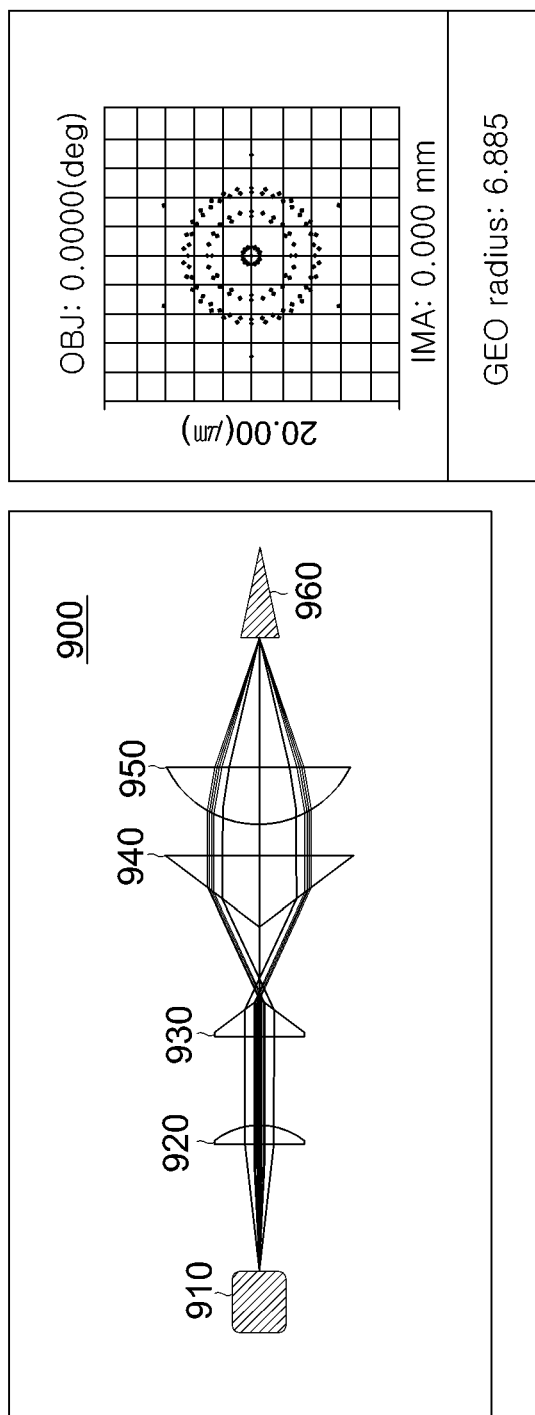
FIG. 9 is a view illustrating the high-resolution inspection apparatus using a terahertz Bessel beam of FIG. 4 according to a first embodiment.

FIG. 9 is a view illustrating the high-resolution inspection apparatus using a terahertz Bessel beam of FIG. 4 according to a first embodiment.

Referring to FIG. 9, the high resolution inspection apparatus 900 includes a terahertz wave generating 10 unit 910, an angle changing unit 920, a Bessel beam forming unit 930, a first lens 940, a second lens 950, and a detection unit 960.

The terahertz wave generating unit 910 may generate a terahertz wave.

The angle changing unit 920 may change the angle of the terahertz wave incident from the terahertz wave generating unit 910 to be smaller and to enter the Bessel beam forming unit 930.

The Bessel beam forming unit 930 may form a terahertz Bessel beam on at least a portion of the inspection target object using the terahertz wave incident from the angle changing unit 920. For example, the Bessel beam forming unit may be an axicon.

The inspection target object may be formed between the Bessel beam forming unit 930 and the first lens 940.

The Bessel beam forming unit 930 may be a first axicon lens having an apical angle at which the diameter of the terahertz Bessel beam is formed to be smaller than the wavelength of the terahertz wave generated by the terahertz wave generating unit.

A maximum value of the apical angle of the first axicon lens may be calculated on the basis of Equation 1 to Equation 3. For example, when the wavelength λ of the terahertz wave is 2.14 mm, a refractive index n of the first axicon lens is 1.54, and an average refractive index $n_0$ of the surrounding environment is 1, the apical angle τ of the first axicon lens has a value of about 119°. Thus, a maximum value of the apical angle of the first axicon lens is about 119°.

Meanwhile, a minimum value of the first axicon lens may be an apical angle of the first axicon lens at which total internal reflection according to the refractive index of the first axicon does not occur. Regarding the refractive index in this embodiment, a critical angle due to total internal reflection is 99°. Therefore, the minimum value of the apical angle of the first axicon lens is about 99°.

Ultimately, the diameter of the terahertz Bessel beam is formed to be smaller than the wavelength of the terahertz wave generated by the terahertz wave generating unit only when the apical angle of the first axicon lens falls between the maximum value 119° to the minimum value 99°.

The first lens 940 may change the angle of the terahertz wave radiated when the terahertz Bessel beam generated by the Bessel beam forming unit 930 is transmitted through the inspection target object.

The first lens 940 may be a second axicon lens arranged to be symmetrical to the first axicon lens 930 with respect to the inspection target object.

The second axicon lens 950 may have an apical angle equal to that of the first axicon lens 930. In this case, the size of the second axicon lens 950 may be smaller than or equal to the size of the first axicon lens 930. When the apical angle of the second axicon lens is equal to that of 20 the first axicon lens 930, efficiency of concentrating the terahertz wave on the detection unit 960 is the highest.

If the angle changing unit 920 is a first convex lens, the second lens 950 may be a second convex lens arranged to be symmetrical to the first convex lens with respect to the inspection target object.

When the wavelength λ of the terahertz wave is 2.14 mm and the first axicon lens of the Bessel beam forming unit 930 has an angle of 110°, the radius of the terahertz wave in the detection unit 960 is 0.006 mm, and thus, the diameter of the terahertz wave is 0.012 mm.

Since the terahertz wave is concentrated using the first lens 940 and the second lens 950, the diameter of the terahertz wave concentrated on the detection unit 960 may be significantly smaller than the diameter of the terahertz wave 15 concentrated on the detection unit 750 of FIG. 8, thus increasing concentration efficiency.

Therefore, when the terahertz wave is concentrated using the first lens 940 and the second lens 950, although the apical angle of the first axicon lens is small, resolution may be significantly increased with high concentration efficiency, and thus, high resolution inspection image may be obtained.

Figure 10:
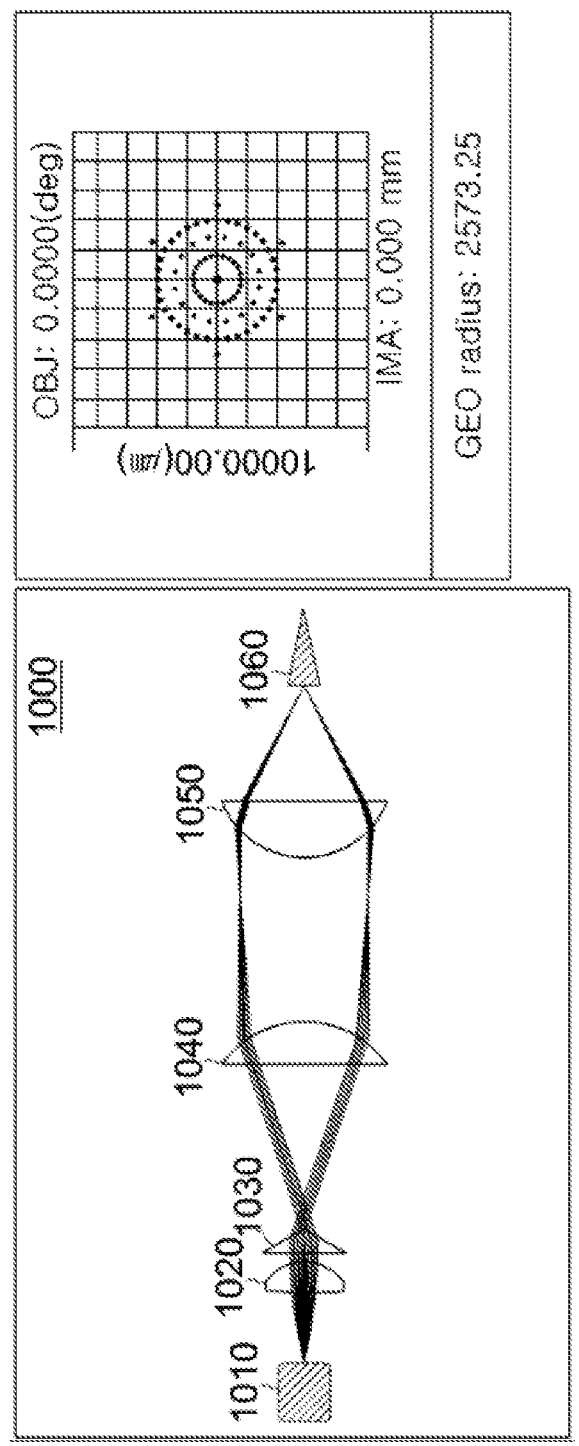
FIG. 10 is a view illustrating the high-resolution inspection apparatus of FIG. 4 according to a second embodiment.

FIG. 10 is a view illustrating the high-resolution inspection apparatus of FIG. 4 according to a second embodiment.

Referring to FIG. 10, the high resolution inspection apparatus 1000 includes a terahertz wave generating unit 1010, an angle changing unit 1020, a Bess& beam forming unit 1030, a first lens 1040, a second lens 1050, and a detection unit 1060.

The terahertz wave generating unit 1010 may generate a terahertz wave.

The angle changing unit 1020 may change the angle of the terahertz wave incident from the terahertz wave generating unit 1010, to be smaller and to enter the Bessel beam forming unit 1030.

The Bessel beam forming unit 1030 may form a terahertz Bessel beam on at least a portion of the inspection target object using the terahertz wave incident from the angle changing unit 1020. For example, the Bessel beam forming unit may be an axicon.

The inspection target object may be formed between the Bessel beam forming unit 1030 and the light concentrating unit 1040.

The Bessel beam forming unit 1030 may be a first axicon lens having an apical angle at which the diameter of the terahertz Bessel beam is smaller than the wavelength of the terahertz wave generated by the terahertz wave generating unit.

The first lens 1040 may be a third convex lens changing the angle of the terahertz wave radiated when the terahertz Bessel beam passes through the inspection target object, to be smaller.

The second lens 1050 may be a fourth convex lens arranged to be symmetrical to the third convex lens with respect to the axis perpendicular to the optical axis.

When the wavelength λ of the terahertz wave is 2.14 mm, the radius of the terahertz wave incident on the detection unit 1060 after being transmitted through the inspection target object is about 2.5 mm, and thus, the diameter of the terahertz wave at the detection unit is about 5 mm.

Since the terahertz wave is concentrated using the first lens 1040 and the second lens 1050, the diameter of the terahertz wave is significantly smaller than the diameter of the terahertz wave concentrated to the detection unit 750 of FIG. 8, and thus, condensation efficiency may be enhanced. Thus, the high resolution inspection apparatus according to the present embodiment may significantly increase resolution with high concentration efficiency even when the apical angle of the first axicon lens is small, thus obtaining a high resolution inspection image.

Figure 11:
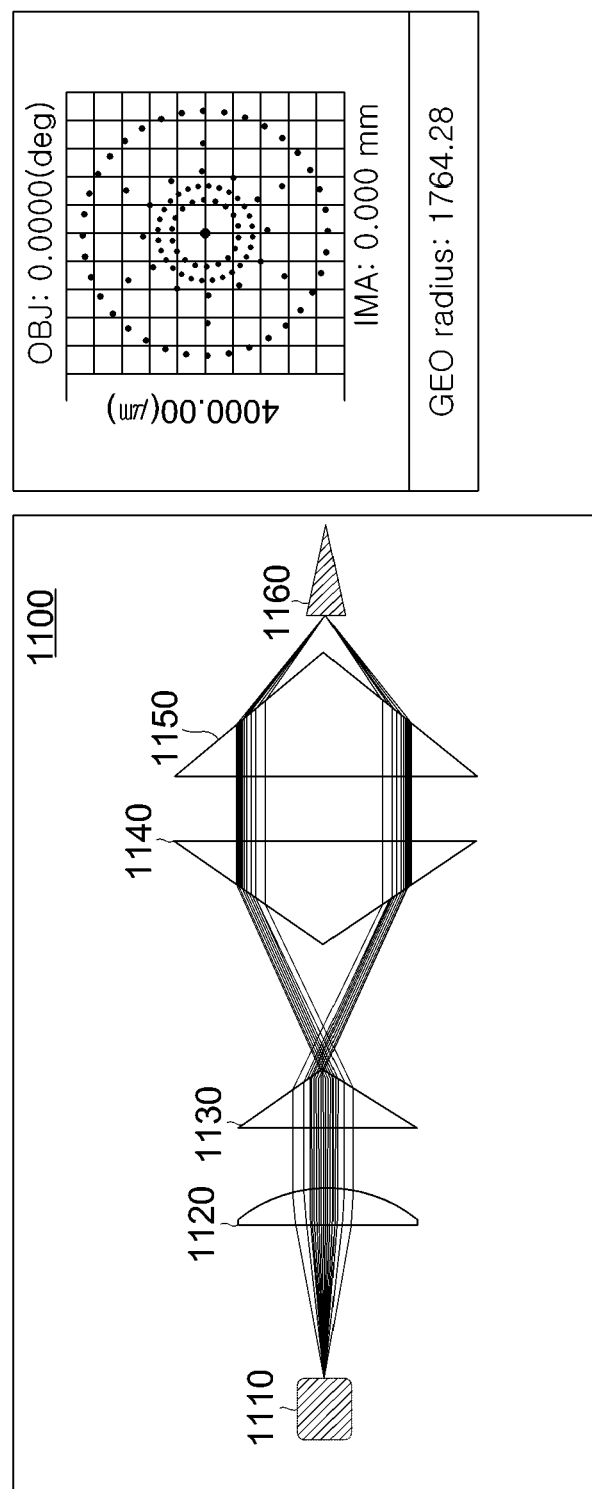
FIG. 11 is a view illustrating the high-resolution inspection apparatus of FIG. 4 according to a third embodiment.

FIG. 11 is a view illustrating the high-resolution inspection apparatus of FIG. 4 according to a third embodiment.

Referring to FIG. 11, a high resolution inspection apparatus 1100 includes a terahertz wave generating unit 1110, an angle changing unit 1120, a BesselC beam forming unit 1130, a first lens 1040, a second lens 1050, and a detection unit 1060.

The terahertz wave generating unit 1110 may generate a terahertz wave.

The angle changing unit 1120 may change the angle of the terahertz wave incident from the terahertz wave generating unit 1110, to be smaller and to enter the Bessel beam forming unit 1130.

The Bessel beam forming unit 1130 may form a terahertz Bessel beam on at least a portion of the inspection target object using the terahertz wave incident from the angle changing unit 1120. For example, the Bessel beam forming unit may be an axicon.

The inspection target object may be formed between the Bessel beam forming unit 1130 and the light concentrating unit 1140.

The Bessel beam forming unit 1130 may be a first axicon lens having an apical angle at which the diameter of the terahertz Bessel beam is smaller than the wavelength of the terahertz wave generated by the terahertz wave generating unit.

The first lens 1140 may be a second axicon lens arranged to be symmetrical to the first axicon lens 1130 with respect to the inspection target object.

The second axicon lens may have an apical angle having the same size as that of the first axicon lens 1130.

The second lens 1150 may have the same shape as the second axicon lens 1140 and may be arranged to be symmetrical to the second axicon lens 1140 with respect to the axis perpendicular to the optical axes.

When the wavelength λ of the terahertz wave is 2.14 mm, the radius of the terahertz wave transmitted through the inspection target object so as to be incident on the detection unit 1160 is about 1.7 mm, and thus, the diameter of the terahertz wave at the detection unit 1160 is about 3.4 mm.

Since the terahertz wave is concentrated using the first lens 1140 and the second lens 1150, the diameter of the terahertz wave may be significantly smaller than the diameter of the terahertz wave concentrated on the detection unit 750 of FIG. 8, thus increasing concentration efficiency. Thus, the high resolution inspection apparatus according to the present embodiment may increase resolution with high concentration efficiency even when the apical angle of the first axicon lens is small, thus obtaining a high resolution inspection image.

Figure 12:
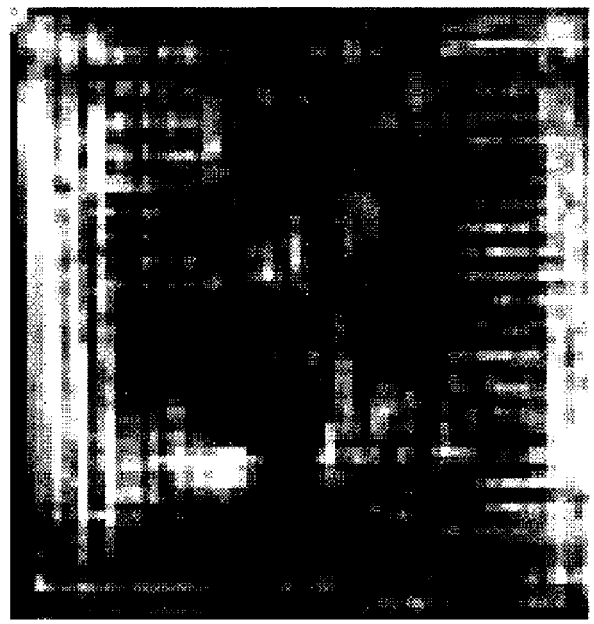
FIGS. 12 and 13 are transmission images obtained by measuring an inspection target object using the apparatuses of FIGS. 8 to 11.
Figure 13:
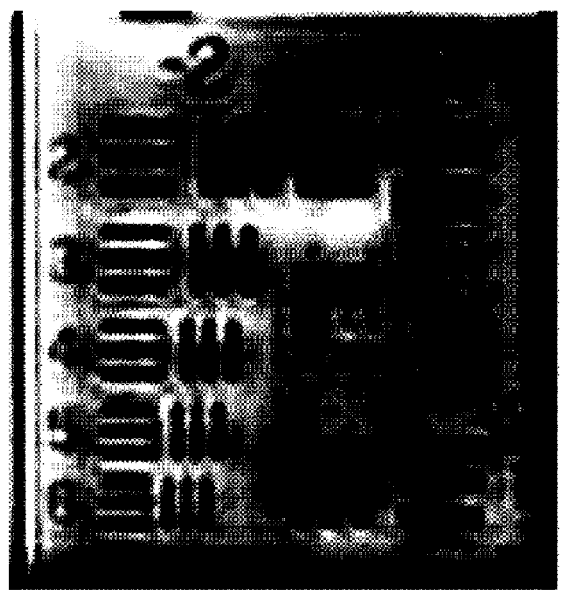

FIGS. 12 and 13 are transmission images obtained by measuring an inspection target object using the apparatuses of FIGS. 8 to 11.

Specifically, FIG. 12 shows an inspection target object measured using the apparatus illustrated in FIG. 8, and FIG. 13 shows an inspection target object measured using the apparatus illustrated in FIGS. 8 to 11.

Referring to FIG. 12, it can be seen that the inspection target object cannot be identified at all with the transmission image obtained by concentrating light with only a single lens.

In contrast, referring to FIG. 13, it can be seen that the inspection target object can be clearly identified with the transmission image obtained by concentrating light with the lens configuration illustrated in FIGS. 8 to 11.

As described above, the high resolution image may be obtained using the high resolution inspection apparatus using a Bessel beam according to the present invention.

Figure 14:
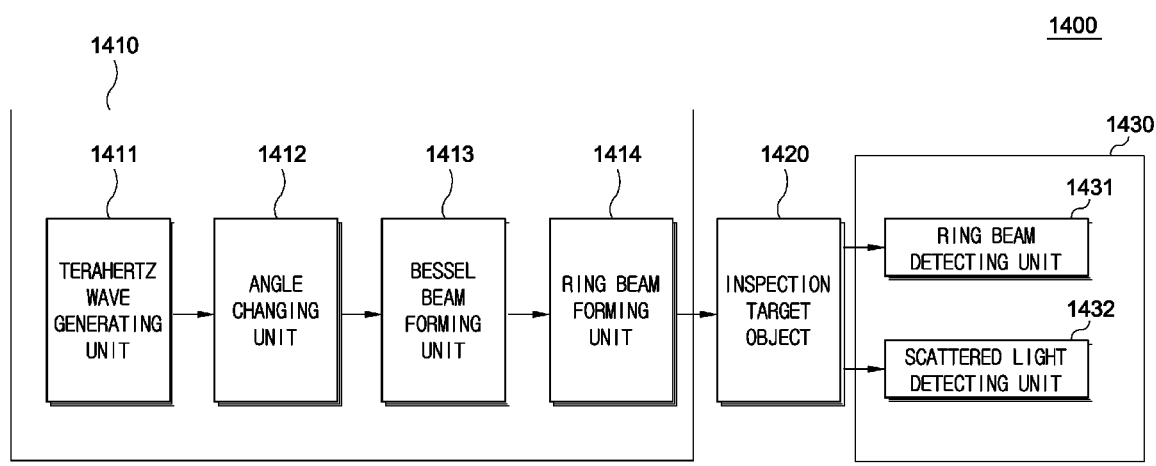
FIG. 14 is a view illustrating a high resolution inspection apparatus using a terahertz Bessel beam according to another embodiment of the present invention.

FIG. 14 is a view illustrating a high resolution inspection apparatus using a terahertz Bessel beam according to another embodiment of the present invention.

Referring to FIG. 14, a high resolution inspection apparatus 1400 using a Bessel beam may include a terahertz wave optical head 1410, an inspection target object 1420, and a terahertz wave concentrating head 1430. Although not illustrated in FIG. 14, the scanner 110, the first transfer unit 150, and the second transfer unit 160 illustrated in FIG. 1 may be additionally provided in this embodiment.

The terahertz wave optical head 1410 may include a terahertz wave generating unit 1411, an angle changing unit 1412, a Bessel beam forming unit 1413, and a ring beam forming unit 1414. In the present embodiment, a case where all the angle changing unit 1412, the Bessel beam forming unit 1413, and the ring beam forming unit 1414 are all included in the terahertz wave optical head 1410 will be described as a reference, but the terahertz wave optical head 1410 may be realized to include only some of the angle changing unit 1412, the Bessel beam forming unit 1413, and the ring beam forming unit 1414.

The terahertz wave generating unit 1411 may generate a terahertz wave.

The angle changing unit 1412 may change the angle of the terahertz wave incident from the terahertz wave generating unit 1411 to be smaller and to enter the Bessel beam forming unit 1413. For example, the angle changing unit 1412 may change the incident terahertz wave to an angle equal to or smaller than a predetermined angle with respect to the optical axis, or to form the incident terahertz wave in parallel. The angle changing unit 1412 may be a convex lens refracting the incident terahertz wave in parallel or a parabolic reflector reflecting the incident terahertz wave in parallel.

The Bessel beam forming unit 1413 may generate a terahertz Bessel beam using the terahertz wave incident from the angle changing unit 1412.

When the angle changing unit 1412 is not provided, the Bessel beam forming unit 1413 may form a terahertz Bessel beam using the terahertz wave incident from the terahertz wave generating unit 1411.

Since it is difficult for the Bessel beam forming unit 1413 to form an ideal Bessel beam in reality, the Bessel beam formed by the Bessel beam forming unit 1413 may be called a quasi-Bessel beam (QBB). A configuration of forming the Bessel beam by the Bessel beam forming unit 1413 has already been described above with reference to FIG. 5.

The Bessel beam forming unit 1413 may be disposed such that a terahertz wave whose angle is changed by the angle changing unit 1412 is incident on be perpendicular with respect to a light incident surface of the Bessel beam forming unit 1413.

The Bessel beam forming unit 1413 may be a fourth axicon lens at which a diameter of a terahertz Bessel beam focused on the inspection target object is smaller than the wavelength of the terahertz wave generated by the terahertz wave generating unit. In this embodiment, the apical angle that forms the diameter of the terahertz Bessel beam which is equal to or smaller than the wavelength is defined as a maximum apical angle.

In this case, a maximum value of the apical angle $\tau$ of the fourth axicon lens may be calculated through equations below using a diameter ($\rho_{FWHM}$) of a full width at half maximum, a wavelength ($\lambda$), and a refractive index ($n, n_0$). Details thereof have already been described above with reference to FIG. 4, and thus, a redundant description will be omitted.

The ring beam forming unit 1414 may form a ring beam using the terahertz Bessel beam and concentrate the formed ring beam to the inspection target object 1420.

For example, the ring beam forming unit 1420 may concentrate the terahertz Bessel beam radiated after having been focused through the Bessel beam forming unit 1413 on the inspection target object again in the form of a ring-shaped circular beam.

For example, the ring beam forming unit 1420 may be a third lens forming a ring beam and concentrates the formed ring beam on the inspection target object.

The ring beam forming unit 1420 will be described in detail with reference to FIGS. 15 to 23.

The inspection target object 1420 refers to a target object to be inspected and may be disposed between the terahertz wave optical head 1410 and the terahertz wave concentrating head 1430.

The terahertz wave concentrating head 1430 may include a ring beam detecting unit 1431 and a scattered light detecting unit 1432. Although not illustrated in this embodiment, the first lens and the second lens (the 'light concentrating unit') described above with respect to FIGS. 4 to 11 may further be included between the inspection target object 1420 and the terahertz wave concentrating head 1430. Thus, since the first lens and the second lens concentrate the ring beam transmitted through the inspection target object 1420 on the ring beam detecting unit 1431, resolution of the inspection apparatus may be enhanced.

The ring beam detecting unit 1431 may detect the ring beam transmitted through the inspection target object 1420.

The scattered light detecting unit 1432 may detect scattered light generated from the inspection target object 1420. For example, the scattered light detecting unit 1432 may include a reflected scattered light detecting unit capable of detecting scattered light reflected from the object 1420 or a transmitted scattered light detecting unit capable of detecting scattered light transmitted from the object 1420.

The image generating unit (not shown) may generate an image using the Bessel beam detected through the ring beam detecting unit 1431 and the scattered light detecting unit 1432. The generated image may be displayed on a display unit (not shown).

A high resolution inspection apparatus using a Bessel beam may form a ring beam without loss of the terahertz wave, thereby enhancing the contrast of a transparent inspection target object.

Further, the high resolution inspection apparatus using a Bessel beam may increase the contrast of the transparent inspection target object by detecting scattered light generated from the inspection target object.

Further, in the high resolution inspection apparatus using a Bessel beam, since the scattered light detecting unit is disposed inside the generated ring beam, a separate space due to an addition of the scattered light detecting unit is not necessary, thus obtaining miniaturization.

In the high resolution inspection apparatus using a Bessel beam, although the apical angle of the axicon of the Bessel beam forming unit is regulated to be small to obtain high resolution, a high resolution image may be obtained by reducing the diameter of the ring beam generated using two lenses of the ring beam forming unit.

Figure 15:
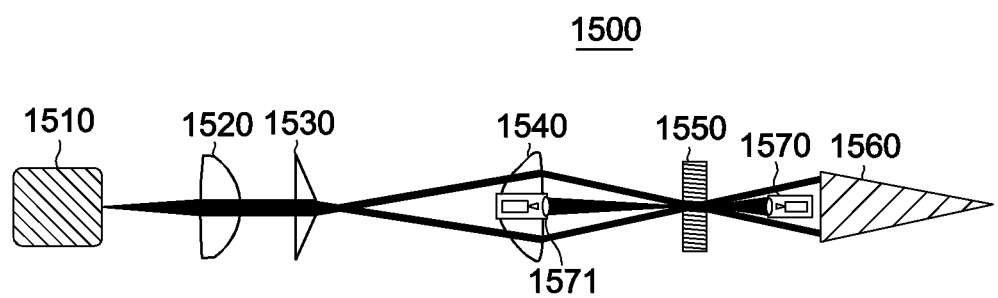
FIG. 15 is a view illustrating the high-resolution inspection apparatus using a terahertz Bessel beam of FIG. 14 according to a first embodiment.

FIG. 15 is a view illustrating the high-resolution inspection apparatus using a terahertz Bessel beam of FIG. 14 according to a first embodiment.

Referring to FIG. 15, a high resolution inspection apparatus 1500 using a Bessel beam includes a terahertz wave generating unit 1510, an angle changing unit 1520, a Bessel beam forming unit 1530, a ring beam forming unit 1540, an inspection target object 1550, a ring beam detecting unit 1560, a transmitted scattered light detecting unit 1570, and a reflected scattered light detecting unit 1571.

The terahertz wave generating unit 1510 may generate a terahertz wave.

The angle changing unit 1520 may change the angle of the terahertz wave incident from the terahertz wave generating unit 1510 to be smaller and to enter the Bessel beam forming unit 1530.

The Bessel beam forming unit 1530 may form a terahertz Bessel beam using the terahertz wave incident from the angle changing unit 1520. For example, the Bessel beam forming unit may be an axicon.

The ring beam forming unit 1540 may be a third lens forming a ring beam using the terahertz Bessel beam incident from the Bessel beam forming unit 1530 and concentrating the formed ring beam on the inspection target object 1550.

The ring beam detecting unit 1560 may detect a ring beam transmitted through the inspection target object 1550.

The transmitted scattered light detecting unit 1570 may detect scattered light transmitted from the inspection target object 1550. For example, the transmitted scattered light detecting unit 1570 may be disposed inside the ring beam incident from the third lens. In this manner, since the transmitted scattered light detecting unit 1570 is disposed inside the ring beam, an overall size of the apparatus is not changed although the transmitted scattered light detecting unit 1570 is additionally provided.

The reflected scattered light detecting unit 1571 may be disposed inside the ring beam exiting from the third lens 1540, which is a ring beam forming unit, and may be provided in the third lens 1540.

Figure 16:
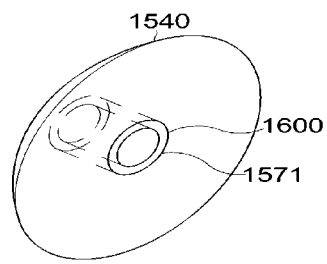
FIG. 16 is a view illustrating a ring beam forming unit 1540 of FIG. 15.

FIG. 16 is a view illustrating the ring beam forming unit 1540 of FIG. 15.

Referring to FIG. 16, the ring beam forming unit 1540 may include a member capable of accommodating the reflected scattered light detecting unit 1571. For example, the ring beam forming unit 1540 may include a hole 1600, and the reflected scattered light detecting unit 1571 may be disposed inside the hole 1600. For example, the reflected scattered light detecting unit 1571 may be disposed inside the ring beam forming unit 1540 and may be disposed inside the ring beam exiting from the third lens 1540. In this manner, since the reflected scattered light detecting unit 1571 is disposed inside the ring beam forming unit 1540, an overall size of the apparatus is not changed although the reflected scattered light detecting unit 1571 is additionally provided.

The high resolution inspection apparatus using a Bessel beam may increase the contrast of a transparent inspection target object by detecting scattered light generated from the inspection target object.

Further, in the high-resolution inspection apparatus using a Bessel beam, since the scattered light detecting unit is disposed inside the generated ring beam, a separate space due to an addition of the scattered light detecting unit is unnecessary, thus obtaining miniaturization.

Figure 17:
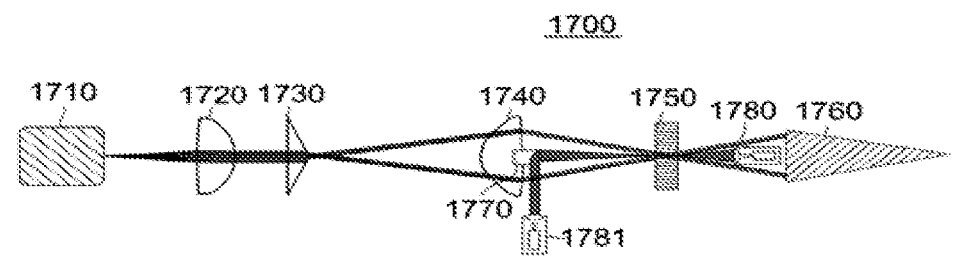
FIG. 17 is a view illustrating the high-resolution inspection apparatus using a terahertz Bessel beam of FIG. 14 according to a second embodiment.

FIG. 17 is a view illustrating the high resolution inspection apparatus using a terahertz Bessel beam of FIG. 14 according to a second embodiment.

Referring to FIG. 17, a high resolution inspection apparatus 1700 using a Bessel beam includes a terahertz wave generating unit 1710, an angle changing unit 1720, a Bessel beam forming unit 1730, a ring beam forming unit 1740, an inspection target object 1750, a ring beam detecting unit 1760, a path changing unit 1770, a transmitted scattered light detecting unit 1780, and a reflected scattered light detecting unit 1781.

The terahertz wave generating unit 1710, the angle changing unit 1720, the Bessel beam forming unit 1730, the ring beam forming unit 1740, and the inspection target object 1750 have already been described, and thus, a redundant description will be omitted.

The ring beam detecting unit 1760 may detect a ring beam transmitted through the inspection target object 1750.

The path changing unit 1770 may change a path of scattered light reflected from the inspection target object 1750. For example, the path changing unit 1770 may cause the reflected scattered light from the inspection target object 1750 to be incident on the reflected scattered light detecting section 1781.

The path changing unit 1770 may be various types of devices capable of making the scattered light incident on the reflected scattered light detecting unit 1781.

The ring beam forming unit 1740 may include a member capable of accommodating the path changing unit 1770.

The transmitted scattered light detecting unit 1780 may detect scattered light transmitted from the inspection target object 1750. For example, the transmitted scattered light detecting unit 1780 may be disposed inside the ring beam incident from the third lens. In this manner, since the transmitted scattered light detecting unit 1780 is disposed inside the ring beam, an overall size of the apparatus is not changed although the transmitted scattered light detecting unit 1780 is additionally provided.

The reflected scattered light detecting unit 1781 may detect scattered light incident from the path changing unit 1770.

The high resolution inspection apparatus using a Bessel beam may increase the contrast of a transparent inspection target object by detecting scattered light generated from the inspection target object.

Figure 18:
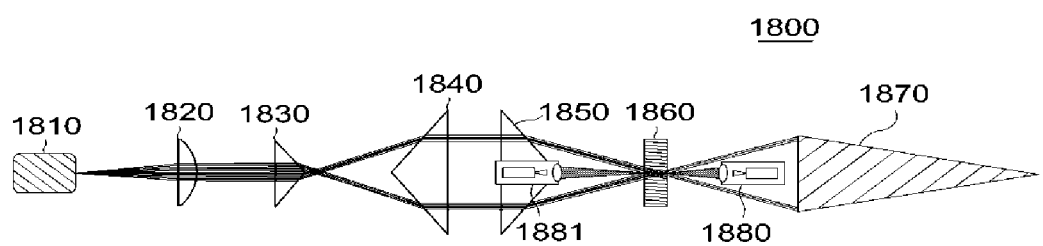
FIG. 18 is a view illustrating the high-resolution inspection apparatus using a terahertz Bessel beam of FIG. 14 according to a third embodiment.

FIG. 18 is a view illustrating the high-resolution inspection apparatus using a terahertz Bessel beam of FIG. 14 according to a third embodiment.

Referring to FIG. 18, a high resolution inspection apparatus 1800 using a Bessel beam includes a terahertz wave generating unit 1810, an angle changing unit 1820, a Bessel beam forming unit 1830, ring beam forming units 1840 and 1850, an inspection target object 1860, a ring beam detecting unit 1870, a transmitted scattered light detecting unit 1880, and a reflected scattered light detecting unit 1881.

The terahertz wave generating unit 1810, the angle changing unit 1820, the Bessel beam forming unit 1830, the inspection target object 1860, the ring beam detecting unit 1870, the transmitted scattered light detecting unit 1880, and the reflected scattered light detecting unit 1881 have already been described above with reference to FIG. 17, and thus, a redundant description will be omitted.

The ring beam forming units 1840 and 1850 may include a fourth lens 1840 changing the angle of the terahertz Bessel beam incident from the Bessel beam forming unit to be smaller and to enter the third lens 1850 and the third lens 1850 forming a ring beam using the terahertz Bessel beam incident from the fourth lens 1840 and concentrating the formed ring beam on the inspection target object 1860.

In a case where the Bessel beam forming unit 1830 is a fourth axicon lens, the fourth lens 1840 may be a fifth axicon lens arranged to be symmetrical to the fourth axicon lens 1830 with respect to a line perpendicular to the optical axis.

The fifth axicon lens 1840 may have an apical angle having the same size as that of the fourth axicon lens 1830. In this case, the size of the fifth axicon lens may be smaller than, equal to, or greater than the size of the fourth axicon lens 1830.

The third lens 1850 may be a sixth axicon lens having the same shape as the fifth axicon lens 1840 and arranged to be symmetrical to the fifth axicon lens 1840 with respect to the axis perpendicular to the optical axis.

In this manner, since the ring beam forming unit is realized using the fourth lens 1840 and the third lens 1850, although the apical angle of the fourth axicon lens is reduced to improve resolution, the diameter of the ring beam incident on the inspection target object may be reduced. Therefore, resolution may be significantly increased, thus obtaining high-resolution reflection and transmission inspection images.

Figure 19:
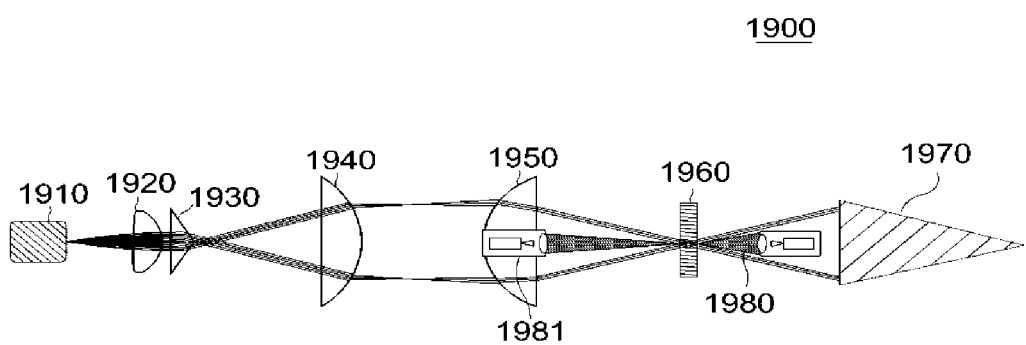
FIG. 19 is a view illustrating the high resolution inspection apparatus using a terahertz Bessel beam of FIG. 14 according to a fourth embodiment.

FIG. 19 is a view illustrating the high-resolution inspection apparatus using the terahertz Bessel beam of FIG. 14 according to a fourth embodiment.

Referring to FIG. 19, a high resolution inspection apparatus 1900 using a Bessel beam includes a terahertz wave generating unit 1910, an angle changing unit 1920, a Bessel beam forming unit 1930, ring beam forming units 1940 and 1950, an inspection target object 1960, a ring beam detecting unit 1970, a transmitted scattered light detecting unit 1980, and a reflected scattered light detecting unit 1981.

The terahertz wave generating unit 1910, the angle changing unit 1920, the Bessel beam forming unit 1930, the inspection target object 1960, the ring beam detecting unit 1970, the transmitted scattered light detecting unit 1980, and the reflected scattered light detecting unit 1981 have already been described above with reference to FIG. 17, and thus, a redundant description will be omitted.

The angle changing unit 1920 may be a fifth convex lens changing the angle of the terahertz wave incident from the terahertz generating unit 1910 to be smaller.

The ring beam forming units 1940 and 1950 may include a fourth lens 1940 changing the angle of the terahertz Bessel beam incident from the Bessel beam forming unit to be smaller and to enter the third lens, and the third lens 1950 forming a ring beam using the terahertz Bessel beam incident from the fourth lens 1940 and concentrating the formed ring beam on the inspection target object 1960.

The fourth lens 1940 may be a seventh convex lens changing the angle of the terahertz wave that radiated when the terahertz Bessel beam is transmitted through the inspection target object.

The third lens 1950 may be an eighth convex lens disposed to be symmetrical to the fifth convex lens, which is the angle changing unit 1920, with respect to the axis perpendicular to the optical axis and to face the seventh convex lens which is the fourth lens 1940. The seventh convex lens and the eighth convex lens may have the same shape/size.

In this manner, since the ring beam forming unit is realized using the second lens and the first lens, although the apical angle of the fourth axicon lens is reduced to increase resolution, the diameter of the ring beam incident on the inspection target object may be reduced to be small. Therefore, resolution may be significantly increased, thus obtaining high-resolution reflection and transmission inspection images.

Figure 20:
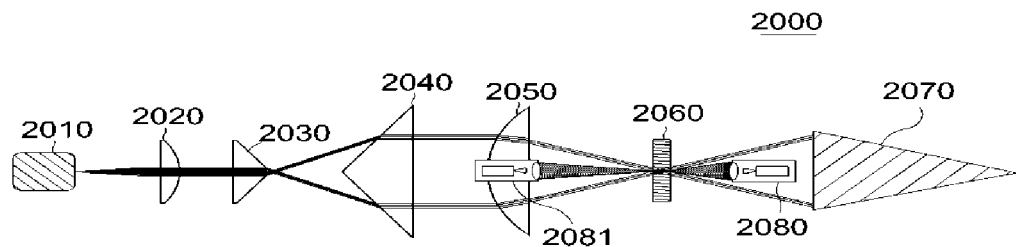
FIG. 20 is a view illustrating the high resolution inspection apparatus using a terahertz Bessel beam of FIG. 14 according to a fifth embodiment.

FIG. 20 is a view illustrating the high-resolution inspection apparatus using a terahertz Bessel beam of FIG. 14 according to a fifth embodiment.

Referring to FIG. 20, a high resolution inspection apparatus 2000 using a Bessel beam includes a terahertz wave generating unit 2010, an angle changing unit 2020, a Bessel beam forming unit 2030, ring beam forming units 2040 and 2050, an inspection target object 2060, a ring beam detecting unit 2070, a transmitted scattered light detecting unit 2080, and a reflected scattered light detecting unit 2081.

The terahertz wave generating unit 2010, the angle changing unit 2020, the Bessel beam forming unit 2030, the inspection target object 2060, the ring beam detecting unit 2070, the transmitted scattered light detecting unit 2080, and the reflected scattered light detecting unit 2801 have already been described above with reference to FIG. 17, and thus, a redundant description will be omitted.

The angle changing unit 2020 may be a fifth convex lens changing the angle of the terahertz wave incident from the terahertz generating unit 2010 to be smaller.

The ring beam forming units 2040 and 2050 may include a fourth lens 2040 changing the angle of the terahertz Bessel beam incident from the Bessel beam forming unit to be smaller and to enter the third lens 2050, and the third lens 2050 forming a ring beam using the terahertz Bessel beam incident from the fourth lens 2040 and concentrating the formed ring beam on the inspection target object 2060.

In a case where the Bessel beam forming unit 2030 is a fourth axicon lens, the fourth lens 2040 may be a fifth axicon lens arranged to be symmetrical to the fourth axicon lens 2030 with respect to a line perpendicular to the optical axis.

The third lens 2050 may be a sixth convex lens arranged to be symmetrical to the fourth convex lens, which is the angle changing unit 2020, with respect to an axis perpendicular to the optical axis.

In this manner, since the ring beam forming unit is realized using the second lens and the first lens, although the apical angle of the fourth axicon lens is reduced to increase resolution, the diameter of the ring beam incident on the inspection target object may be reduced to be smaller. Therefore, resolution may be significantly increased, thus obtaining high-resolution reflection and transmission inspection images.

Figure 21:
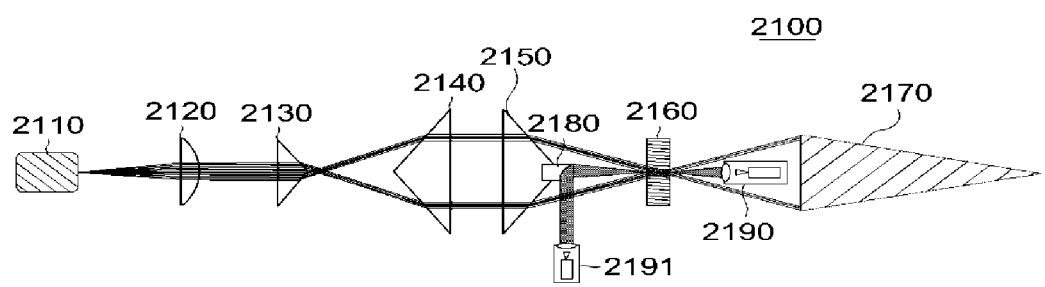
FIG. 21 is a view illustrating the high-resolution inspection apparatus using a terahertz Bessel beam of FIG. 14 according to a sixth embodiment.

FIG. 21 is a view illustrating the high-resolution inspection apparatus using a terahertz Bessel beam of FIG. 14 according to a sixth embodiment.

Referring to FIG. 21, a high resolution inspection apparatus 2100 using a Bessel beam includes a terahertz wave generating unit 2110, an angle changing unit 2120, a Bessel beam forming unit 2130, ring beam forming units 2140 and 2150, an inspection target object 2160, a ring beam detecting unit 2170, a path changing unit 2180, a transmitted scattered light detecting unit 2190, and a reflected scattered light detecting unit 2191.

The terahertz wave generating unit 2110, the angle changing unit 2120, the Bessel beam forming unit 2130, the inspection target object 2160, the ring beam detecting unit 2170, the path changing unit 2180, the transmitted scattered light detecting unit 2190, and the reflected scattered light detecting unit 2191 have already been described above with reference to FIG. 17, and thus, a redundant description will be omitted.

The ring beam forming units 2140 and 2150 may include a second lens 2140 changing the angle of the terahertz Bessel beam incident from the Bessel beam forming unit to be smaller and to enter the third lens 2150, and the third lens 2150 forming a ring beam using the terahertz Bessel beam incident from the fourth lens 2140 and concentrating the formed ring beam on the inspection target object 2160.

In a case where the Bessel beam forming unit 2130 is a fourth axicon lens, the fourth lens 2140 may be a fifth axicon lens arranged to be symmetrical to the fourth axicon lens 2130 with respect to the line perpendicular to the optical axis.

The fifth axicon lens 2140 may have an apical angle having the same size as that of the fourth axicon lens 2130. In this case, the size of the fifth axicon lens may be smaller than, equal to, or larger than the size of the fourth axicon lens 2130. When the apical angle of the fifth axicon lens is equal to that of the fourth axicon lens 2130, efficiency of concentration of the terahertz wave on the detection unit 2170 is the highest.

The third lens 2150 may be a fifth axicon lens having the same shape as the fifth axicon lens 2140 and arranged to be symmetrical to the fifth axicon lens 2140 with respect to the axis perpendicular to the optical axis.

Figure 22:
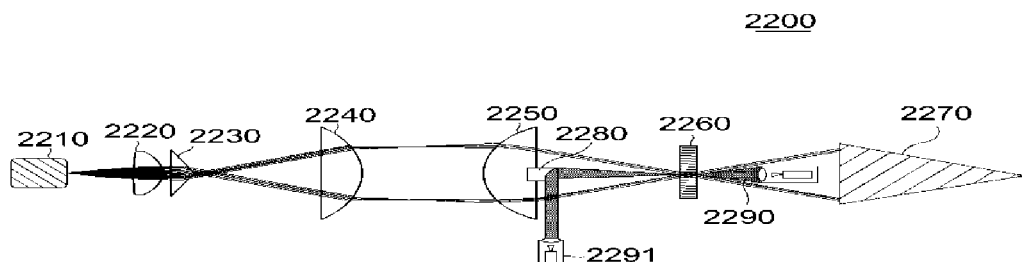
FIG. 22 is a view illustrating the high-resolution inspection apparatus using a terahertz Bessel beam of FIG. 14 according to a seventh embodiment.

FIG. 22 is a view illustrating the high-resolution inspection apparatus using a terahertz Bessel beam of FIG. 14 according to a seventh embodiment.

Referring to FIG. 22, a high resolution inspection apparatus 2200 using a Bessel beam includes a terahertz wave generating unit 2210, an angle changing unit 2220, a Bessel beam forming unit 2230, ring beam forming units 2240 and 2250, an inspection target object 2260, a ring beam detecting unit 2270, a path changing unit 2280, a transmitted scattered light detecting unit 2290, and a reflected scattered light detecting unit 2291.

The terahertz wave generating unit 2210, the angle changing unit 2220, the Bessel beam forming unit 2230, the inspection target object 2260, the ring beam detecting unit 2270, the path changing unit 2280, the transmitted scattered light detecting unit 2290, and the reflected scattered light detecting unit 2291 have already been described above with reference to FIG. 17, and thus, a redundant description will be omitted.

The angle changing unit 2220 may be a fifth convex lens changing the angle of the terahertz wave incident from the terahertz generating unit 2210 to be smaller.

The ring beams forming units 2240 and 2250 may include a fourth lens 2240 changing the angle of the terahertz Bessel beam incident from the Bessel beam forming unit to be smaller and to enter the third lens 2250, and the third lens 2250 forming a ring beam using the terahertz Bessel beam incident from the fourth lens 2240 and concentrating the formed ring beam on the inspection target object 2260.

The third lens 2240 may be a seventh convex lens changing the angle of the terahertz wave radiated when the terahertz Bessel beam is transmitted through the inspection target object, to be smaller.

The third lens 2250 may be an eighth convex lens arranged to be symmetrical to the fifth convex lens, which is the angle changing unit 2220, with respect to the axis perpendicular to the optical axis and to face the seventh convex lens which is the fourth lens 2240.

Figure 23:
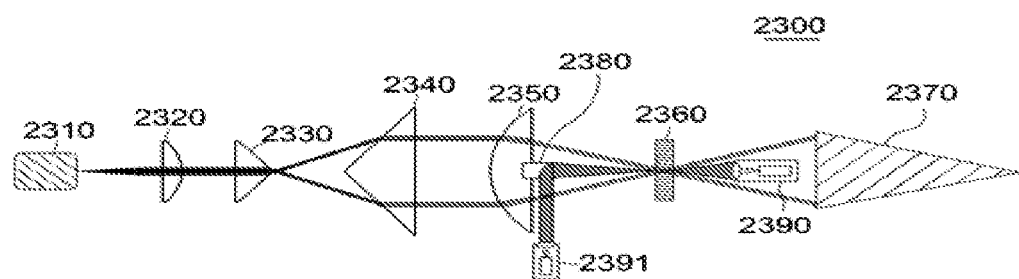
FIG. 23 is a view illustrating the high-resolution inspection apparatus using a terahertz Bessel beam of FIG. 14 according to an eighth embodiment.

FIG. 23 is a view illustrating the high-resolution inspection apparatus using a terahertz Bessel beam of FIG. 14 according to an eighth embodiment.

Referring to FIG. 23, a high resolution inspection apparatus 2300 using a Bessel beam includes a terahertz wave generating unit 2310, an angle changing unit 2320, a Bessel beam forming unit 2330, ring beam forming units 2340 and 2350, an inspection target object 2360, a ring beam detecting unit 2370, a path changing unit 2380, a transmitted scattered light detecting unit 2390, and a reflected scattered light detecting unit 2391.

The terahertz wave generating unit 2310, the angle changing unit 2320, the Bessel beam forming unit 2330, the ring beam forming units 2340 and 2350, the inspection target object 2360, the ring beam detecting unit 2370, the path changing unit 2380, the transmitted scattered light detecting unit 2390, and the reflected scattered light detecting unit 2391 have already been described above with reference to FIG. 17, and thus, a redundant description will be omitted.

The angle changing unit 2320 may be a fourth convex lens changing the angle of the terahertz wave incident from the terahertz generating unit 2310 to be smaller.

The ring beams forming units 2340 and 2350 may include a fourth lens 2340 changing the angle of the terahertz Bessel beam incident from the Bessel beam forming unit to be smaller and to enter the third lens 2350, and the third lens 2350 forming a ring beam using the terahertz Bessel beam incident from the fourth lens 2340 and concentrating the formed ring beam on the inspection target object 2360

In a case where the Bessel beam forming unit 2330 is a fourth axicon lens, the fourth lens 2340 may be a fifth axicon lens arranged to be symmetrical to the fourth axicon lens 2330 with respect to the line perpendicular to the optical axis.

The third lens 2350 may be a sixth convex lens arranged to be symmetrical to the fifth convex lens, which is the angle changing unit 2320, with respect to the axis perpendicular to the optical axis.

All of some of the embodiments may be selectively combined to be configured into various modifications.

Also, it should be appreciated that the embodiment is for description and is not intended for limitation. Also, it will be understood by those skilled in the art that various changes and modifications may be made without departing from the spirit and scope of the invention.

The invention claimed is:

1. A high resolution inspection apparatus using a terahertz Bessel beam, the high resolution inspection apparatus comprising:
- a terahertz wave generating unit generating a terahertz wave;
- a Bessel beam forming unit forming a terahertz Bessel beam at an inspection target object using a terahertz wave incident from the terahertz wave generating unit;
- a first lens changing an angle of the terahertz wave radiated, when the terahertz Bessel beam is transmitted through the inspection target object, to be smaller;
- a second lens concentrating the terahertz wave passing through the first lens and toward a terahertz wave detection unit;
- the terahertz wave detection unit for detecting the terahertz wave concentrated by the second lens; and
- the Bessel beam forming unit is a first axicon lens having an apical angle at which a diameter of the terahertz Bessel beam is smaller than a wavelength of the terahertz wave generated by the terahertz wave generating unit.

2. The high resolution inspection apparatus of claim 1, wherein a minimum value of the first axicon lens has an apical angle of the first axicon lens at which total internal reflection, according to the refractive index of the first axicon, does not occur.

3. The high resolution inspection apparatus of claim 1, wherein the first lens is a second axicon lens arranged to be symmetrical to the first axicon lens with respect to the inspection target object.

4. The high resolution inspection apparatus of claim 2, wherein the second axicon lens has an apical angle which has a same size as the first axicon lens.

5. The high resolution inspection apparatus of claim 1, further include angle changing unit for changing an angle of the terahertz wave incident from the terahertz wave generating unit to be smaller and to enter the Bessel beam forming unit.

6. The high resolution inspection apparatus of claim 4,
wherein the angle changing unit is a first convex lens for changing the angle of the terahertz wave incident from the terahertz wave generating unit to be smaller; and
the second lens is a second convex lens arranged to be symmetrical to the first convex lens with respect to the inspection target object.

7. The high resolution inspection apparatus of claim 2,
wherein the second lens is a third axicon lens having a same shape as the second axicon lens and arranged to be symmetrical to the second axicon lens with respect to an axis perpendicular to an optical axis.

8. The high resolution inspection apparatus of claim 2,
wherein the first lens is a third convex lens for changing an angle of the terahertz wave radiated when the terahertz Bessel beam is transmitted through the inspection target object.

9. The high resolution inspection apparatus of claim 7,
wherein the second lens is a fourth convex lens arranged to be symmetrical to the third convex lens with respect to the axis perpendicular to the optical axis.

* * * * *